United States Patent
Hilgendorff et al.

(10) Patent No.: US 9,034,269 B2
(45) Date of Patent: May 19, 2015

(54) DIESEL OXIDATION CATALYST COMPRISING PALLADIUM, GOLD AND CERIA

(71) Applicants: BASF SE, Ludwigshafen (DE); BASF Corporation, Florham Park, NJ (US)

(72) Inventors: Marcus Hilgendorff, Hannover Bemerode (DE); Alfred H. Punke, Walle (DE); Torsten W. Müller-Stach, Hannover (DE); Gerd Grubert, Hannover (DE); Torsten Neubauer, Langenhagen (DE); Jeffrey B. Hoke, North Brunswick, NJ (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/091,389

(22) Filed: Nov. 27, 2013

(65) Prior Publication Data
US 2014/0161695 A1     Jun. 12, 2014

Related U.S. Application Data

(60) Provisional application No. 61/730,984, filed on Nov. 29, 2012.

(51) Int. Cl.
*B01D 50/00* (2006.01)
*B01D 53/34* (2006.01)
(Continued)

(52) U.S. Cl.
CPC .......... *B01J 29/7415* (2013.01); *B01J 37/0244* (2013.01); *B01J 37/0246* (2013.01); *B01J 37/0248* (2013.01); *B01J 23/66* (2013.01); *B01D 53/944* (2013.01); *B01J 29/7007* (2013.01); *B01J 35/1019* (2013.01); *F01N 3/103* (2013.01);
(Continued)

(58) Field of Classification Search
CPC ............ B01J 21/00; B01J 23/42; B01J 23/44; B01J 23/52; B01J 23/66; B01J 29/74
USPC ............. 502/66, 74, 243, 261–263, 302–304, 502/326, 327, 332–334, 339, 344, 349–351, 502/415, 439, 527.12, 527.13; 422/170, 422/177, 180
See application file for complete search history.

(56) References Cited

U.S. PATENT DOCUMENTS

| 4,961,917 A | 10/1990 | Byrne |
| 5,516,497 A | 5/1996 | Speronello et al. |

(Continued)

FOREIGN PATENT DOCUMENTS

| EP | 1938893 | 7/2008 |
| FR | 2939329 | 6/2010 |

(Continued)

OTHER PUBLICATIONS

PCT International Search Report and Written Opinion in PCT/EP2013/074838, mailed Mar. 24, 2014, 12 pages.

*Primary Examiner* — Cam N. Nguyen
(74) *Attorney, Agent, or Firm* — Servilla Whitney LLC

(57) ABSTRACT

The present invention relates to a diesel oxidation catalyst comprising a carrier substrate, and a first washcoat layer disposed on the substrate, the first washcoat layer comprising palladium supported on a support material comprising a metal oxide, gold supported on a support material comprising a metal oxide, and a ceria comprising compound, as well as a process for the preparation of such catalyst.

21 Claims, 4 Drawing Sheets

(51) Int. Cl.

| | | |
|---|---|---|
| *B01J 29/00* | (2006.01) | |
| *B01J 29/06* | (2006.01) | |
| *B01J 21/00* | (2006.01) | |
| *B01J 21/04* | (2006.01) | |
| *B01J 23/00* | (2006.01) | |
| *B01J 23/02* | (2006.01) | |
| *B01J 23/06* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 20/00* | (2006.01) | |
| *B01J 29/74* | (2006.01) | |
| *B01J 37/02* | (2006.01) | |
| *B01J 23/66* | (2006.01) | |
| *B01D 53/94* | (2006.01) | |
| *B01J 23/63* | (2006.01) | |
| *B01J 29/70* | (2006.01) | |
| *B01J 35/10* | (2006.01) | |
| *F01N 3/10* | (2006.01) | |
| *F01N 3/08* | (2006.01) | |
| *F01N 3/20* | (2006.01) | |
| *F01N 3/035* | (2006.01) | |

(52) U.S. Cl.
CPC ... *B01D2255/1023* (2013.01); *B01D 2255/106* (2013.01); *B01J 2523/00* (2013.01); *B01J 23/63* (2013.01); *B01D 2255/1021* (2013.01); *B01D 2255/1025* (2013.01); *B01D 2255/1026* (2013.01); *B01D 2255/1028* (2013.01); *B01D 2255/2063* (2013.01); *B01D 2255/2065* (2013.01); *B01D 2255/2066* (2013.01); *B01D 2255/2068* (2013.01); *B01D 2255/20715* (2013.01); *B01D 2255/20792* (2013.01); *B01D 2255/2094* (2013.01); *B01D 2255/9022* (2013.01); *B01D 2255/9025* (2013.01); *B01D 2255/9155* (2013.01); *F01N 3/0814* (2013.01); *F01N 3/2066* (2013.01); *F01N 3/035* (2013.01); *F01N 2510/06* (2013.01); *Y10S 502/52712* (2013.01); *Y10S 502/52713* (2013.01)

(56) References Cited

U.S. PATENT DOCUMENTS

| | | | | |
|---|---|---|---|---|
| 6,777,370 | B2 * | 8/2004 | Chen | 502/241 |
| 6,923,945 | B2 * | 8/2005 | Chen | 423/239.1 |
| 7,709,407 | B1 * | 5/2010 | Hao | 502/60 |
| 7,745,367 | B2 * | 6/2010 | Fujdala et al. | 502/60 |
| 8,252,258 | B2 * | 8/2012 | Muller-Stach et al. | 423/213.2 |
| 8,475,752 | B2 * | 7/2013 | Wan | 423/213.2 |
| 8,586,780 | B2 * | 11/2013 | Hagemeyer et al. | 560/247 |
| 8,652,429 | B2 * | 2/2014 | Sumiya et al. | 423/213.2 |
| 8,667,785 | B2 * | 3/2014 | Blakeman et al. | 60/299 |
| 8,765,625 | B2 * | 7/2014 | Hao et al. | 502/66 |
| 2005/0164879 | A1 * | 7/2005 | Chen | 502/328 |
| 2008/0125308 | A1 | 5/2008 | Fujdala et al. | |
| 2010/0180581 | A1 * | 7/2010 | Grubert et al. | 60/297 |
| 2011/0143921 | A1 | 6/2011 | Hao et al. | |
| 2013/0149207 | A1 * | 6/2013 | Castagnola et al. | 422/177 |
| 2013/0149222 | A1 * | 6/2013 | Blakeman et al. | 423/213.5 |
| 2013/0217566 | A1 * | 8/2013 | Wang et al. | 502/74 |
| 2013/0236380 | A1 * | 9/2013 | Golden et al. | 423/213.2 |
| 2013/0331258 | A1 * | 12/2013 | Hao et al. | 502/66 |
| 2014/0130760 | A1 * | 5/2014 | Sumiya et al. | 123/1 A |
| 2014/0147359 | A1 * | 5/2014 | Bergeal et al. | 423/213.5 |
| 2014/0186244 | A1 * | 7/2014 | Blakeman et al. | 423/213.5 |

FOREIGN PATENT DOCUMENTS

| | | |
|---|---|---|
| WO | WO-97/00119 | 1/1997 |
| WO | WO-2010/083313 | 7/2010 |
| WO | WO-2013/190268 | 12/2013 |

* cited by examiner
DIESEL OXIDATION CATALYST COMPRISING PALLADIUM, GOLD AND CERIA

CROSS-REFERENCE TO RELATED APPLICATIONS

This application claims the benefit of priority under 35 U.S.C. §119(e) to U.S. Provisional Application No. 61/730,984, filed Nov. 29, 2012, the entire content of which is incorporated herein by reference in its entirety.

TECHNICAL FIELD

The present invention relates to a diesel oxidation catalyst comprising Pd, Au and ceria as well as to a process for the preparation of this catalyst. Further, the present invention relates to a system for treating a gaseous exhaust stream of a diesel engine comprising this catalyst.

BACKGROUND

Operation of lean burn engines, for example diesel engines and lean burn gasoline engines, provide the user with excellent fuel economy and have very low emissions of gas phase hydrocarbons and carbon monoxide due to their operation at high air/fuel ratios under fuel lean conditions. Diesel engines, in particular, offer significant advantages over gasoline engines in terms of their fuel economy, durability, and their ability to generate high torque at low speed. From the standpoint of emissions, however, diesel engines generally exhibit more severe problems than their spark-ignition counterparts. Emission problems relate to particulate matter, nitrogen oxides (NOx), unburned hydrocarbons (HC) and carbon monoxide (CO), wherein NOx describes various chemical species of nitrogen oxides, including nitrogen monoxide and nitrogen dioxide, among others.

Oxidation catalysts comprising precious metals, such as gold, platinum, palladium, rhodium, iridium, ruthenium and osmium, dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts may be contained in diesel oxidation catalysts (DOC) or, more generally, catalytic converters which are placed in the exhaust flow path from a diesel powered engine to treat the exhaust gas stream. Typically, the diesel oxidation catalysts are prepared on ceramic or metallic carrier substrates upon which one or more catalyst coating compositions are deposited. In addition to the conversion of gaseous HC, CO and the soluble organic fraction of particulate matter, oxidation catalysts containing precious metals dispersed on a refractory oxide support may promote the oxidation of nitric oxide to nitric dioxide.

As is well-known in the art, catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, it is known in the art to include an adsorbent material, which may be a zeolite, as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

As mentioned, oxidation catalysts comprising a precious metal dispersed on a refractory metal oxide support are known for use in treating exhaust gas emissions from diesel engines. Platinum remains the most effective platinum group metal for oxidizing CO and HC in a DOC, after high temperature aging under lean conditions and in the presence of fuel sulfur. Nevertheless, one of the major advantages of using palladium based catalysts is the lower cost of palladium compared to platinum. However, palladium based DOC typically show higher light-off temperatures for oxidation of CO and HC, especially when used with HC storage materials, potentially causing a delay in HC and or CO light-off. Palladium containing DOC may decrease the activity of platinum to convert paraffins and/or oxidize nitric oxide and may also make the catalyst more susceptible to sulfur poisoning. These characteristics have typically prevented the use of Pd as an oxidation catalyst in lean burn operations especially for light duty diesel applications where engine temperatures remain below 250° C. for most driving conditions.

WO 2010/083313 discloses a diesel oxidation catalyst comprising at least two, specifically three distinct layers, at least one of which contains an oxygen storage compound that is present in a layer separate from the majority of the precious metal components, such as palladium and platinum. The catalyst disclosed therein aims to improved light-off performance.

EP 1 938 893 A2 discloses an engine exhaust catalyst comprising a first supported catalyst comprising platinum and a second supported catalyst comprising palladium and gold. The catalyst is directed to the reduction of CO emissions from a vehicle.

However, as emissions regulations become more stringent, there is a continuing goal to develop diesel oxidation catalyst systems that provide improved performance, for example, light-off performance. Consequently, it was an object of the present invention to provide a diesel oxidation catalyst which shows improved CO conversions and light-off temperatures.

Surprisingly, it was found that this object can be solved by a diesel oxidation catalyst which comprises a washcoat layer which is disposed on a carrier substrate, wherein in this washcoat layer, palladium, gold, and additionally a ceria comprising compound are contained, wherein palladium is supported on a support material which comprises a metal oxide and gold is supported on a support material comprising a metal oxide.

SUMMARY

Therefore, the present invention relates to a diesel oxidation catalyst comprising a carrier substrate, and a first washcoat layer disposed on the substrate, the first washcoat layer comprising palladium supported on a support material comprising a metal oxide, gold supported on a support material comprising a metal oxide, and a ceria comprising compound.

Further, the present invention relates to a process for the preparation of a diesel oxidation catalyst, in particular the diesel oxidation mentioned above, wherein this process comprises
a) providing a carrier substrate,
b) applying a first washcoat layer onto the substrate by impregnating the substrate with a mixture comprising palladium supported, preferably impregnated on a support material comprising a metal oxide, gold supported, preferably impregnated on a support material comprising a metal oxide, and a ceria comprising compound, optionally followed by calcination preferably carried out at a temperature in the range of from 450 to 700° C.;

c) optionally applying a second washcoat onto the substrate obtained from b), having disposed thereon the first washcoat layer, optionally followed by calcination preferably carried out at a temperature in the range of from 450 to 700° C.;

d) optionally applying a third washcoat onto the substrate obtained from c), having disposed thereon the first washcoat layer and disposed on the first washcoat layer the second washcoat layer, optionally followed by calcination preferably carried out at a temperature in the range of from 450 to 700° C.;

e) optionally applying further washcoats onto the substrate obtained from d) having disposed thereon the first washcoat layer, disposed on the first washcoat layer the second washcoat layer and disposed on the second washcoat layer the third washcoat layer, optionally followed by calcination preferably carried out at a temperature in the range of from 450 to 700° C.;

wherein preferably, either only the first, or only the first and the second, or only the first and the second and the third washcoat are applied.

Yet further, the present invention relates to a system for treating a gaseous exhaust stream of a diesel engine, the system comprising an exhaust conduit in fluid communication with the diesel engine via an exhaust manifold, the diesel oxidation catalyst as defined above, wherein the carrier substrate is a wall-flow substrate or a flow through substrate, and one or more of the following in fluid communication with the layered diesel oxidation catalyst composite: a catalyzed soot filter (CSF), a selective catalytic reduction (SCR) article, a NOx storage and reduction (NSR) catalytic article.

DETAILED DESCRIPTION

Figure 1:
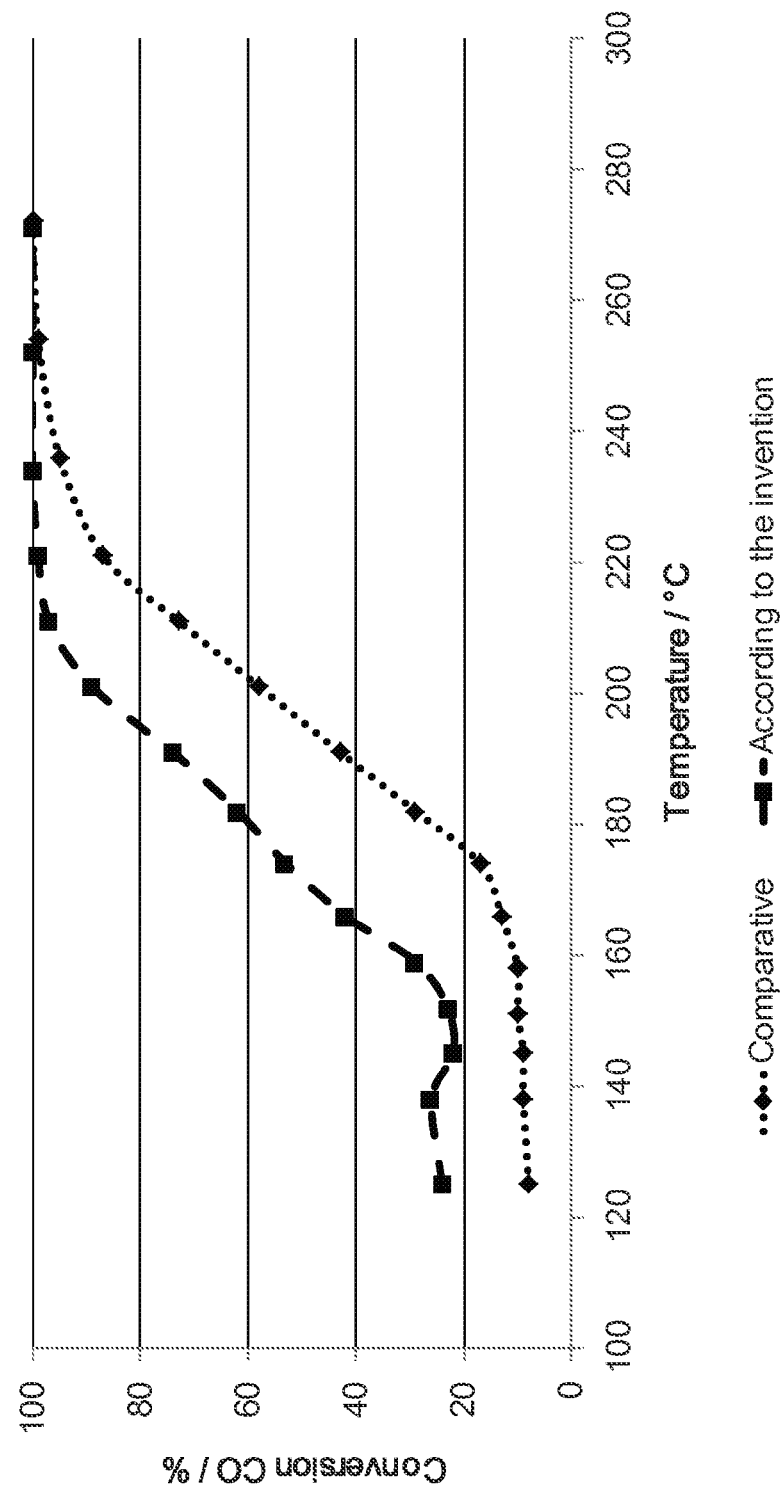
FIG. 1 shows a CO light-off curve obtained from the treatment of diesel exhaust using the DOC provided in example 3 comprising three layers as well as a comparative catalyst comprising no ceria comprising compound in the first washcoat layer. The x-axis of the diagram denoted "Temperature/° C." shows the respective catalyst inlet temperature in ° C. and ranges from 100° C. to 300° C., whereas the y-axis denoted "conversion CO/%" shows the corresponding conversion of CO to $CO_2$ in % and ranges from 0% to 100%.

It has surprisingly been found that a diesel oxidation catalyst according to the present invention comprising a carrier substrate, and a first washcoat layer disposed on the substrate, the first washcoat layer comprising palladium supported on a support material comprising a metal oxide, gold supported on a support material comprising a metal oxide, and a ceria comprising compound, affords improved performance with regard to CO oxidation, especially during the cold-start period of an exhaust treatment process.

As to the carrier substrate, any material may be used provided that it supports the first washcoat layer and/or more washcoat layers of the diesel oxidation catalyst and that it is resistant to the conditions during the exhaust gas treatment process. Suitable substrate materials include the materials typically used for preparing catalysts, and will usually comprise a ceramic or metal honeycomb structure.

The carrier substrate may have any conceivable shape, provided that it allows for the fluid contact with at least a portion of the washcoat layers present thereon. Preferably, the substrate is a monolith, wherein more preferably the monolith is a flow-through monolith. Accordingly, the monolithic substrate preferably contains fine, parallel gas flow passages extending from an inlet to an outlet face of the substrate, such that passages are open to fluid flow. Such substrates are commonly referred to as honeycomb flow through substrates. The passages, which are essentially straight paths from their fluid inlet to their fluid outlet, are defined by walls on which the washcoats are disposed, so that the gases flowing through the passages contact the catalytic material. The flow passages of the monolithic substrate are generally thin-walled channels which can be of any suitable cross-sectional shape and size such as trapezoidal, rectangular, square, sinusoidal, hexagonal, oval, or circular. Such structures preferably contain from 60 to 1,300, preferably 60 to 400 gas inlet openings (i.e., cells) per square inch of cross section.

The substrate can be made from materials commonly known in the art. For this purpose, porous materials are preferably used as the substrate material, in particular ceramic and ceramic-like materials such as cordierite, alumina such as alpha- or gamma-alumina, an aluminosilicate, cordierite-alumina, silicon carbide, aluminum titanate, silicon nitride, zirconia, mullite, zircon, zircon mullite, zircon silicate, sillimanite, a magnesium silicate, petalite, spodumene, alumina-silica-magnesia and zirconium silicate, as well as porous refractory metals and oxides thereof. According to the present invention, the term "refractory metal" refers to one or more metals selected from the group consisting of titanium, zirconium, hafnium, vanadium, niobium, tantalum, chromium, molybdenum, tungsten, and rhenium. The substrate may also be formed of ceramic fiber composite materials. Preferably, an aluminosilicate is used as the substrate material, more preferably cordierite is used.

The carrier substrates useful for the catalysts of embodiments of the present invention may also be metallic in nature and be composed of one or more metals or metal alloys. The metallic substrates may be employed in various shapes such as corrugated sheet or monolithic form. Suitable metallic supports include heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt.-% of the alloy, e.g., 10 to 25 wt.-% of chromium, 3 to 8 wt.-% of aluminum and up to 20 wt.-% of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the subsequent adherence of the washcoat compositions to the substrate.

While it may be conceivable that an intermediate layer is disposed between the carrier substrate and the first washcoat layer, for example for improving the adherence of the first washcoat layer to the carrier substrate, it is particularly preferred that the first washcoat layer is disposed directly on the carrier substrate which means that in particular no intermediate layer exists between the carrier substrate and the first washcoat layer.

First Washcoat Layer

In general, no specific restrictions exist concerning the palladium content, the gold content and the content of the ceria comprising compound in the first washcoat layer according to the present invention. Preferably, the first washcoat layer comprises palladium, calculated as element, in an amount of from 0.1 to 200 g/ft$^3$, more preferably from 0.5 to 150 g/ft$^3$, more preferably from 1 to 100 g/ft$^3$, more preferably from 5 to 75 g/ft$^3$, more preferably from 10 to 50 g/ft$^3$, more preferably from 20 to 40 g/ft$^3$, more preferably from 25 to 37 g/ft$^3$, more preferably from 30 to 34 g/ft$^3$. Preferably, the first washcoat layer comprises gold, calculated as element, in an amount of from 0.1 to 100 g/ft$^3$, more preferably from 1 to 80 g/ft$^3$, more preferably from 10 to 70 g/ft$^3$, more preferably from 20 to 60 g/ft$^3$, more preferably from 30 to 50 g/ft$^3$, more preferably from 35 to 45 g/ft$^3$, more preferably from 38 to 42 g/ft$^3$. Preferably, the first washcoat layer comprises ceria, calculated as $CeO_2$, in an amount of from 0.001 to 10 g/inch$^3$, more preferably from 0.01 to 4 g/inch$^3$, more preferably from 0.05 to 1 g/inch$^3$, more preferably from 0.2 to 0.6 g/inch$^3$, more preferably from 0.3 to 0.5 g/inch$^3$.

Preferably, the first washcoat layer comprises palladium, calculated as element, in an amount of from 0.1 to 200 g/ft$^3$, gold, calculated as element, in an amount of from 0.1 to 100 g/ft$^3$, and ceria, calculated as $CeO_2$, in an amount of from 0.001 to 10 g/inch$^3$. More preferably, the first washcoat layer comprises palladium, calculated as element, in an amount of from 0.5 to 150 g/ft$^3$, gold, calculated as element, in an amount of from 1 to 80 g/ft$^3$, and ceria, calculated as $CeO_2$, in an amount of from 0.01 to 4 g/inch$^3$. More preferably, the first washcoat layer comprises palladium, calculated as element, in an amount of from 1 to 100 g/ft$^3$, gold, calculated as element, in an amount of from 10 to 70 g/ft$^3$, and ceria, calculated as $CeO_2$, in an amount of from 0.05 to 1 g/inch$^3$. More preferably, the first washcoat layer comprises palladium, calculated as element, in an amount of from 5 to 75 g/ft$^3$, gold, calculated as element, in an amount of from 20 to 60 g/ft$^3$, and ceria, calculated as $CeO_2$, in an amount of from 0.2 to 0.6 g/inch$^3$. More preferably, the first washcoat layer comprises palladium, calculated as element, in an amount of from 10 to 50 g/ft$^3$, gold, calculated as element, in an amount of from 30 to 50 g/ft$^3$, and ceria, calculated as $CeO_2$, in an amount of from 0.3 to 0.5 g/inch$^3$. More preferably, the first washcoat layer comprises palladium, calculated as element, in an amount of from 25 to 37 g/ft$^3$, gold, calculated as element, in an amount of from 35 to 45 g/ft$^3$, and ceria, calculated as $CeO_2$, in an amount of from 0.3 to 0.5 g/inch$^3$. More preferably, the first washcoat layer comprises palladium, calculated as element, in an amount of from 30 to 34 g/ft$^3$, gold, calculated as element, in an amount of from 38 to 42 g/ft$^3$, and ceria, calculated as $CeO_2$, in an amount of from 0.3 to 0.5 g/inch$^3$.

Generally, the first washcoat layer may also contain precious metals other than gold and palladium, such as platinum, optionally supported on a support material comprising a metal oxide. No specific restrictions exist as far as the content of the first washcoat layer relative to these precious metals is concerned. Preferably, the first washcoat layer comprises at most 0.1 wt.-% of a precious metal other than gold and palladium, calculated as element and based on the weight of the first washcoat layer. More preferably, the first washcoat layer comprises at most 0.075 wt.-%, more preferably at most 0.05 wt.-%, more preferably at most 0.025 wt.-%, and more preferably at most 0.01 wt.-% of a precious metal other than gold and palladium, calculated as element and based on the weight of the first washcoat layer. It is most preferred that the first washcoat is free of these precious metals. The term "free of a precious meta" as used in this context of the present invention means that the precious metal is either not contained at all or only contained in traces as impurity.

The ceria comprising compound comprised in the first washcoat layer of the present invention preferably contains ceria preferably in an amount of at least 90 wt.-%, based on the total weight of the compound. Apart from ceria, the ceria comprising compound may contain further components such as at least one stabilizing component. Generally, any stabilizing component known in the art as suitable stabilizing component for ceria, in particular for ceria comprised in a diesel oxidation catalyst, can be comprised in the ceria comprising compound. Preferably, the at least one stabilizing component contains at least one of the group consisting of zirconium, hafnium, tin, zinc, aluminum, silicon, a rare earth metal other than cerium, preferably selected from the group consisting of lanthanum, praseodymium and neodymium, and a combination of two or more thereof. More preferably, the at least one stabilizing component contains at least one of the group consisting of zirconium, a rare earth metal selected from the group consisting of lanthanum, praseodymium and neodymium, and a combination of two or more thereof. More preferably, the ceria comprising compound comprised in the first washcoat layer contains ceria in an amount of at least 92 wt.-%, more preferably at least 94 wt.-%, more preferably at least 96 wt.-%, more preferably at least 98 wt.-%, more preferably at least 99 wt.-%, more preferably at least 99.9 wt.-%, based on the weight of the compound. Preferably, the ceria comprising compound consists of ceria.

The ceria comprised in the ceria comprising compound preferably has a surface area of at least 50 m$^2$/g, more preferably at least 100 m$^2$/g, more preferably 120 m$^2$/g. Preferably, the surface area of the ceria comprised in the ceria comprising compound is after treatment at 900° C. for 5 h at least 20 m$^2$/g, more preferably at least 30 m$^2$/g, more preferably at least 35 m$^2$/g. The surface area refers to the BET surface area and is determined according to DIN 66135. The ceria comprised in the ceria comprising compound preferably has a pore volume of at least 0.1 cm$^3$/g, more preferably of at least 0.2 cm$^3$/g, more preferably of at least 0.3 m$^3$/g. The porosity is determined by Hg-porosimetry according to DIN 66133. The particle size of the ceria comprised in the ceria comprising compound is preferably in the range of from 1 to 50 micrometer, preferably from 10 to 25 micrometer (Dv90).

Generally, the first washcoat layer may also contain a zeolite. Generally, there are no specific restrictions as far as the zeolite content of the first washcoat layer is concerned. Preferably, the first washcoat layer comprises at most 0.1 wt.-% zeolite, based on the weight of the first washcoat layer. More preferably, the first washcoat layer comprises at most 0.075 wt.-%, more preferably at most 0.05 wt.-%, more preferably at most 0.025 wt.-%, more preferably at most 0.01 wt.-% zeolite, based on the weight of the first washcoat layer. It is most preferred that the first washcoat layer is free of zeolite. The term "free of zeolite" as used in this context of the present invention means that zeolite is either not contained at all or only contained in traces as impurity.

Regarding the term "zeolite" as used in this context of the present invention, any natural or synthetic zeolite is meant, having any typical framework structure type, such as structure types ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON or a mixture of one or more thereof. Zeolites in their H-form or any other form are included as well as with any silica to alumina ratio or any possible metal doping resulting from typical ion exchange procedures known in the art.

Generally, the first washcoat layer may also contain an alkaline earth metal such as barium. Generally, there are no specific restrictions as far as the barium content of the first washcoat layer is concerned. Regarding the barium content, barium is to be understood as being in its elemental form as well as being present in a barium comprising compound, such as barium oxide, barium acetate, barium hydroxide, barium carbonate and barium hydrogen carbonate. Preferably, the first washcoat layer comprises at most 1 wt.-% barium, calculated as barium oxide and based on the weight of the first washcoat layer. More preferably the first washcoat layer comprises at most 0.75 wt.-%, more preferably at most 0.5 wt.-%, more preferably at most 0.25 wt.-%, more preferably at most 0.1 wt.-%, more preferably at most 0.075 wt.-%, more preferably at most 0.05 wt.-%, more preferably at most 0.025 wt.-%, more preferably at most 0.01 wt.-% barium, calculated as barium oxide and based on the weight of the first washcoat layer. It is most preferred that the first washcoat layer is free of barium. The term "free of barium" as used in this context of the present invention means that barium is either not contained at all or only contained in traces as impurity.

Further, there are no specific restrictions as far as the alkaline earth metal content of the first washcoat layer is concerned. Regarding the alkaline earth metal content, alkaline earth metal is to be understood as being in its elemental form as well as being present in an alkaline earth metal compound. Preferably, the first washcoat layer comprises at most 1.0 wt.-% alkaline earth metal, calculated as element and based on the weight of the first washcoat layer. More preferably the first washcoat layer comprises at most 0.75 wt.-%, more preferably at most 0.5 wt.-%, more preferably at most 0.25 wt.-%, more preferably at most 0.1 wt.-%, more preferably at most 0.075 wt.-%, more preferably at most 0.05 wt.-%, more preferably at most 0.025 wt.-%, more preferably at most 0.01 wt.-% alkaline earth metal, calculated as element and based on the weight of the first washcoat layer. It is most preferred that the first washcoat layer is free of alkaline earth metal. The term "free of alkaline earth metal" as used in this context of the present invention means that alkaline earth metal is either not contained at all or only contained in traces as impurity.

Further, there are no specific restrictions as far as the alkaline metal content of the first washcoat layer is concerned. Regarding the alkaline metal content, alkaline metal is to be understood as being in its elemental form as well as being present in an alkaline metal compound. Preferably, the first washcoat layer comprises at most 1.0 wt.-% alkaline metal, calculated as element and based on the weight of the first washcoat layer. More preferably the first washcoat layer comprises at most 0.75 wt.-%, more preferably at most 0.5 wt.-%, more preferably at most 0.25 wt.-%, more preferably at most 0.1 wt.-%, more preferably at most 0.075 wt.-%, more preferably at most 0.05 wt.-%, more preferably at most 0.025 wt.-%, more preferably at most 0.01 wt.-% alkaline metal, calculated as element and based on the weight of the first washcoat layer. It is most preferred that the first washcoat layer is free of alkaline metal. The term "free of alkaline metal" as used in this context of the present invention means that alkaline metal is either not contained at all or only contained in traces as impurity.

Generally, any support material comprising a metal oxide can be used, provided that it can withstand the conditions during the treatment of automotive exhaust gas. Preferably, the support material comprising a metal oxide, on which gold and palladium are supported, comprises at least one metal oxide selected from the group consisting of alumina, preferably gamma-alumina, zirconia, silica, titania, silica-alumina, zirconia-alumina, titania-silica, titania-zirconia, titania-alumina, lanthana-alumina, lanthana-gamma-alumina, lanthana-zirconia-alumina, and combinations of two or more thereof, more preferably selected from the group consisting of gamma-alumina, lanthana-gamma-alumina and a mixture thereof.

The surface area of the support material comprising a metal oxide is preferably in the range of from 50 to 300 m$^2$/g, more preferably from 100 to 200 m$^2$/g, more preferably from 120 to 180 m$^2$/g, more preferably from 130 to 170 m$^2$/g.

The support material comprising a metal oxide is preferably used in particulate form. More preferably, the particle size of the support material comprising a metal oxide, characterized by the respective Dv90 value, comprised in the first washcoat layer is preferably in the range of from 0.1 to 50 micrometer, more preferably from 1 to 20 micrometer, more preferably from 4 to 15 micrometer, more preferably from 6 and 10 micrometer. The term "Dv90 value" as referred to in the context of the present invention describes the average particle size compared to which 90 vol.-% of the particles of support material comprising a metal oxide have a smaller size. In particular, the Dv90 values as referred to in the context of the present invention are to be understood as being determined using the apparatus and the respective parameters as specifically described in Reference Example 1.

According to the present invention, the gold comprised in the first washcoat layer can be supported on a support material which is different from the support material on which the palladium is supported. Preferably, gold is contained in the first washcoat layer supported on a support material comprising a metal oxide, which metal oxide is selected from the group consisting of alumina, preferably gamma-alumina, zirconia, silica, titania, silica-alumina, zirconia-alumina, titania-silica, titania-zirconia, titania-alumina, lanthana-alumina, lanthana-gamma-alumina, lanthana-zirconia-alumina, and combinations of two or more thereof, more preferably selected from the group consisting of gamma-alumina, lanthana-gamma-alumina and a mixture thereof, and palladium is contained in the first washcoat layer supported on a support material comprising a metal oxide, which metal oxide is selected from the group consisting of alumina, preferably gamma-alumina, zirconia, silica, titania, silica-alumina, zirconia-alumina, titania-silica, titania-zirconia, titania-alumina, lanthana-alumina, lanthana-gamma-alumina, lanthana-zirconia-alumina, and combinations of two or more thereof, more preferably selected from the group consisting of gamma-alumina, lanthana-gamma-alumina and a mixture thereof. Preferably, the support material on which gold is supported and the support material on which palladium is supported are the same support materials.

According to an embodiment of the present invention, the first washcoat layer consists of gold supported on a support material comprising a metal oxide, palladium supported on a support material comprising a metal oxide, and a ceria comprising compound.

Therefore, the present invention also relates to a diesel oxidation catalyst comprising a carrier substrate, and a first washcoat layer directly disposed on the substrate, the first washcoat layer consisting of palladium supported on a support material comprising a metal oxide, preferably supported on gamma-alumina or lanthana-gamma-alumina, gold supported on a support material comprising a metal oxide, preferably supported on gamma-alumina or lanthana-gamma-alumina, and a ceria comprising compound, preferably ceria. Yet further, the present invention relates to a diesel oxidation catalyst comprising a carrier substrate, and a first washcoat layer directly disposed on the substrate, the first washcoat layer consisting of palladium supported on a support material comprising a metal oxide, preferably supported on gamma-alumina or lanthana-gamma-alumina, gold supported on a support material comprising a metal oxide, preferably supported on gamma-alumina or lanthana-gamma-alumina, and a ceria comprising compound, preferably ceria, wherein the palladium, calculated as element, is comprised in an amount of from 0.1 to 200 g/ft$^3$, more preferably from 0.5 to 150 g/ft$^3$, more preferably from 1 to 100 g/ft$^3$, more preferably from 5 to 75 g/ft$^3$, more preferably from 10 to 50 g/ft$^3$, more preferably from 20 to 40 g/ft$^3$, more preferably from 25 to 37 g/ft$^3$, more preferably from 30 to 34 g/ft$^3$, wherein the gold, calculated as element, is comprised in an amount of from 0.1 to 100 g/ft$^3$, more preferably from 1 to 80 g/ft$^3$, more preferably from 10 to 70 g/ft$^3$, more preferably from 20 to 60 g/ft$^3$, more preferably from 30 to 50 g/ft$^3$, more preferably from 35 to 45 g/ft$^3$, more preferably from 38 to 42 g/ft$^3$, and wherein the ceria, calculated as CeO$_2$, is comprised in an amount of from 0.001 to 10 g/inch$^3$, more preferably from 0.01 to 4 g/inch$^3$, more preferably from 0.05 to 1 g/inch$^3$, more preferably from 0.2 to 0.6 g/inch$^3$, more preferably from 0.3 to 0.5 g/inch$^3$.

Further Washcoat Layers

In addition to the first washcoat layer, the diesel oxidation catalyst of the present invention may comprise additional washcoat layers. Generally, there are no specific restrictions as far as the number of washcoat layers of the present diesel oxidation catalyst is concerned. In the context of the present invention, the washcoat layer disposed directly on the carrier substrate is referred to as the first washcoat layer.

According to one embodiment of the present invention, the diesel oxidation catalyst preferably comprises the first washcoat layer and no additional washcoat layer disposed on the first washcoat layer.

Therefore, the present invention relates to a diesel oxidation catalyst consisting of a carrier substrate, and a first washcoat layer directly disposed on the substrate, the first washcoat layer consisting of palladium supported on a support material comprising a metal oxide, preferably supported on gamma-alumina or lanthana-gamma-alumina, gold supported on a support material comprising a metal oxide, preferably supported on gamma-alumina or lanthana-gamma-alumina, and a ceria comprising compound, preferably ceria. Yet further, the present invention relates to a diesel oxidation catalyst consisting of a carrier substrate, and a first washcoat layer directly disposed on the substrate, the first washcoat layer consisting of palladium supported on a support material comprising a metal oxide, preferably supported on gamma-alumina or lanthana-gamma-alumina, gold supported on a support material comprising a metal oxide, preferably supported on gamma-alumina or lanthana-gamma-alumina, and a ceria comprising compound, preferably ceria, wherein the palladium, calculated as element, is comprised in an amount of from 0.1 to 200 g/ft$^3$, more preferably from 0.5 to 150 g/ft$^3$, more preferably from 1 to 100 g/ft$^3$, more preferably from 5 to 75 g/ft$^3$, more preferably from 10 to 50 g/ft$^3$, more preferably from 20 to 40 g/ft$^3$, more preferably from 25 to 37 g/ft$^3$, more preferably from 30 to 34 g/ft$^3$, wherein the gold, calculated as element, is comprised in an amount of from 0.1 to 100 g/ft$^3$, more preferably from 1 to 80 g/ft$^3$, more preferably from 10 to 70 g/ft$^3$, more preferably from 20 to 60 g/ft$^3$, more preferably from 30 to 50 g/ft$^3$, more preferably from 35 to 45 g/ft$^3$, more preferably from 38 to 42 g/ft$^3$, and wherein the ceria, calculated as CeO$_2$, is comprised in an amount of from 0.001 to 10 g/inch$^3$, more preferably from 0.01 to 4 g/inch$^3$, more preferably from 0.05 to 1 g/inch$^3$, more preferably from 0.2 to 0.6 g/inch$^3$, more preferably from 0.3 to 0.5 g/inch$^3$.

According to other embodiments of the present invention, the diesel oxidation catalyst comprises, in addition to the first washcoat layer, one, two, three, four, five or more washcoat layers, preferably one or two washcoat layers, disposed one after the other on the first washcoat layer. According to one other preferred embodiment, the diesel oxidation catalyst comprises a second washcoat layer disposed on the first washcoat layer and no additional washcoat layer disposed on the second washcoat layer. According to one other preferred embodiment, the diesel oxidation catalyst comprises a second washcoat layer disposed on the first washcoat layer, a third washcoat layer disposed on the second washcoat layer, and no additional washcoat layer disposed on the third washcoat layer.

In case the diesel oxidation catalyst of the present invention contains at least one washcoat layer in addition to the first washcoat layer, at least one of the at least one further washcoat layer preferably comprises at least one zeolite and at least one of the at least one further washcoat layer preferably comprises at least one precious metal preferably selected from the group consisting of platinum, palladium, rhodium, iridium, ruthenium and osmium, wherein the precious metal is preferably supported on a support material preferably comprising a metal oxide.

The at least one zeolite can be a natural or synthetic zeolite. Typically, any zeolite can be used, such as zeolites having framework structure type ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or a mixture or a mixed structure of one or more of these framework structure types. Preferably, the at least one zeolite has a BEA framework structure. Preferably, a beta zeolite is used.

The at least one zeolite can exhibit any suitable silica to alumina ratio. Preferably, the molar silica to alumina ratio is in the range of from 1:1 to 300:1, more preferably from 50:1 to 200:1, more preferably from 90:1 to 180:1. It is also preferred that the silica to alumina ratio is at least 400, more preferably at least 500, more preferably at least 600, more preferably at least 630. Preferably, the zeolite is present in its H-form.

The at least one zeolite may be used independently of the number of further washcoats of the diesel oxidation catalyst. Therefore, these zeolites may be contained in the diesel oxidation catalyst according to the present invention if the diesel oxidation catalyst comprises two, three, four, five or more washcoat layers. Generally, there are no specific restrictions as far as the number of different zeolites in a washcoat layer is concerned. Thus, a washcoat layer may comprise one, two, three or more zeolites.

Generally, there are no specific restrictions as far as the amount of zeolite present in at least one of the at least one further washcoat layer is concerned. Preferably, the at least one zeolite is contained preferably in at least one of the at least one washcoat layer in an amount of from 0.001 to 10 g/inch$^3$, more preferably from 0.01 to 4 g/inch$^3$, more preferably from 0.05 to 1.5 g/inch$^3$, more preferably from 0.25 to 0.75 g/inch$^3$, more preferably from 0.4 to 0.6 g/inch$^3$.

Further, independently of the presence of the zeolite, at least one of the at least one further washcoat layer preferably comprises at least one precious metal selected from the group consisting of gold, platinum, palladium, rhodium, iridium, ruthenium and osmium, wherein the precious metal is preferably supported on a support material preferably comprising a metal oxide. More preferably, the precious metal is selected from the group consisting of platinum, palladium, rhodium, iridium, ruthenium and osmium, wherein the precious metal is preferably supported on a support material comprising a metal oxide. Preferably, the metal oxide is selected from the group consisting of alumina, preferably gamma-alumina, zirconia, silica, titania, silica-alumina, zirconia-alumina, titania-silica, titania-zirconia, titania-alumina, lanthana-alumina, lanthana-zirconia-alumina, and combinations of two or more thereof. The precious metal present in at least one of the at least one further washcoat layer is preferably present in an amount of from 0.1 to 200 g/ft$^3$.

In case the diesel oxidation catalyst comprises at least one further washcoat layer, it is preferred that at least one of the at least one further washcoat layer comprises two or more different precious metals, preferably two different precious metals. The at least two different precious metals are preferably selected from the group consisting of platinum, palladium, rhodium, iridium, ruthenium and osmium. In case that one or more further washcoat layers comprise two different precious metals, the two different precious metals are preferably platinum and palladium.

In this context, at least one of the at least one further washcoat layer comprises preferably the two ore more precious metals, independently from each other, in an amount of from 0.1 to 200 g/ft$^3$, more preferably in an amount of from 0.5 to 150 g/ft$^3$. In case platinum and palladium are present in at least one of the at least one further washcoat layer, platinum is preferably present in at least one of the at least one further washcoat layer an amount of from 10 to 80 g/ft$^3$, more preferably from 35 to 65 g/ft$^3$, more preferably from 40 to 50 g/ft$^3$, more preferably from 43 to 47 g/ft$^3$, and palladium is preferably present in at least one of the at least one further washcoat layer an amount of from 1 to 40 g/ft$^3$, more preferably from 3 to 20 g/ft$^3$, more preferably from 5 to 15 g/ft$^3$, more preferably from 6 to 10 g/ft$^3$.

The two or more different precious metals, preferably the two different precious metals, are preferably supported on one or more support material comprising a metal oxide. Preferably, the metal oxide is selected from the group consisting of alumina, preferably gamma-alumina, zirconia, silica, titania, silica-alumina, preferably silica-gamma-alumina, zirconia-alumina, preferably zirconia-gamma-alumina, titania-silica, titania-zirconia, titania-alumina, preferably titania-gamma-alumina, lanthana-alumina, preferably lanthana-gamma-alumina, lanthana-zirconia-alumina, preferably lanthana-zirconia-gamma-alumina, and combinations of two or more thereof.

In case the diesel oxidation catalyst comprises at least one further washcoat layer comprising at least one metal oxide which is silica-gamma-alumina, the silica content of the silica-gamma-alumina is preferably at most 50 wt.-% based on the silica-gamma-alumina, more preferably at most 25 wt.-%, more preferably at most 10 wt.-%, more preferably at most 5 wt.-%, more preferably at most 3 wt.-%, more preferably at most 1 wt.-%.

Preferably, at least one of the at least one further washcoat layers comprises silica, either as such or as metal oxide comprised in a support material for a precious metal. It was found that the presence of silica may improve the resistance of the diesel oxidation catalyst to sulfur containing compounds such as sulfur oxides like SO$_2$ and SO$_3$.

Generally, there are no specific restrictions as far as the gold content of one or more of the at least one further washcoat layer is concerned. Preferably, none of the at least one further washcoat layer comprises more than 0.1 wt.-% gold, preferably more than 0.075 wt.-%, more preferably more than 0.05 wt.-%, more preferably more than 0.025 wt.-%, more preferably more than 0.01 wt.-%, calculated as element and based on the weight of the respective further washcoat layer. It is even more preferred that all of the at least one further washcoat layers are free of gold. The term "free of gold" as used in this context of the present invention means that gold is either not contained at all or only contained in traces as impurity.

Two Washcoat Layers

According to a preferred embodiment of the present invention, the diesel oxidation catalyst comprises a second washcoat layer disposed on the first washcoat layer and contains no further washcoat layer disposed on the second washcoat layer.

According to this embodiment, the second washcoat layer comprises at least one precious metal selected from the group consisting of gold, platinum, palladium, rhodium, iridium, ruthenium and osmium, preferably consisting of platinum, palladium, rhodium, iridium, ruthenium and osmium, wherein palladium, or platinum, or palladium and platinum is/are preferred. Preferably, the palladium is supported on a support material comprising a metal oxide and the platinum is supported on a support material comprising a metal oxide. Preferably, the support materials comprising a metal oxide are independently selected from the group consisting of alumina, preferably gamma-alumina, zirconia, silica, titania, silica-alumina, preferably silica-gamma-alumina, zirconia-alumina, preferably zirconia-gamma-alumina, titania-silica, titania-zirconia, titania-alumina, preferably titania-gamma-alumina, lanthana-alumina, preferably lanthana-gamma-alumina, lanthana-zirconia-alumina, preferably lanthana-zirconia-gamma-alumina, and combinations of two or more thereof. More preferably, the support materials comprising a metal oxide are independently selected from the group consisting of alumina, preferably gamma-alumina and silica-alumina, preferably silica-gamma-alumina.

According to said embodiment of the present invention wherein the diesel oxidation catalyst comprises a second washcoat layer disposed on the first washcoat layer and no further washcoat layer disposed on the second washcoat layer, there are generally no specific restrictions as far as the palladium and/or platinum content in the second washcoat layer are concerned. Preferably, the second washcoat layer comprises palladium in an amount of from 0.1 to 200 g/ft$^3$, more preferably from 0.5 to 50 g/ft$^3$, more preferably from 1 to 20 g/ft$^3$, more preferably from 5 to 15 g/ft$^3$. Preferably, the second washcoat layer comprises platinum in an amount of from 0.1 to 200 g/ft$^3$, more preferably from 1 to 100 g/ft$^3$, more preferably from 20 to 80 g/ft$^3$, more preferably from 30 to 60 g/ft$^3$. More preferably, the second washcoat layer comprises palladium in an amount of from 0.1 to 200 g/ft$^3$ and platinum in an amount of from 0.1 to 200 g/ft$^3$. More preferably, the second washcoat layer comprises palladium in an amount of from 0.5 to 50 g/ft$^3$ and platinum in an amount of from 1 to 100 g/ft$^3$. More preferably, the second washcoat layer comprises palladium in an amount of from 1 to 20 g/ft$^3$ and platinum in an amount of from 20 to 80 g/ft$^3$. More preferably, the second washcoat layer comprises palladium in an amount of from 5 to 15 g/ft$^3$ and platinum in an amount of from 30 to 60 g/ft$^3$.

In said embodiment, the second washcoat layer further comprises at least one zeolite. The at least one zeolite can be a natural or synthetic zeolite. Typically, any zeolite can be used, such as zeolites having framework structure type ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or a mixture or a mixed structure of one or more of these framework structure types. Preferably, the at least one zeolite has a BEA framework structure, or FAU framework structure such as zeolite USZ like USZ-1. Preferably, a beta zeolite or a USZ-1 zeolite is used. The zeolite can contain any suitable silica to alumina ratio. Preferably, the silica to alumina ratio is in the range of from 1:1 to 300:1, more preferably from 50:1 to 200:1, more preferably from 80:1 to 180:1. It is also preferred that the silica to alumina ratio is at least 400:1, more preferably at least 500:1, more preferably at least 600:1 and more preferably at least 630:1. Preferably, the zeolite is present in its H-form.

Generally, there are no specific restrictions as far as the amount of zeolite present in at least one of the at least one further washcoat layer is concerned. Preferably, the at least one zeolite is contained preferably in the second washcoat layer in an amount of from 0.001 to 10 g/inch$^3$, more preferably from 0.01 to 4 g/inch$^3$, more preferably from 0.05 to 1.5 g/inch$^3$, more preferably from 0.25 to 0.75 g/inch$^3$, more preferably from 0.4 to 0.6 g/inch$^3$.

In said embodiment, the second washcoat layer preferably comprises at most 0.1 wt.-%, more preferably at most 0.075 wt.-%, more preferably at most 0.05 wt.-%, more preferably at most 0.025 wt.-%, more preferably at most 0.001 wt.-% of ceria, calculated as $CeO_2$ and based on the weight of the second washcoat layer.

In said embodiment, the second washcoat layer preferably comprises at most 0.1 wt.-%, more preferably at most 0.075 wt.-%, more preferably at most 0.05 wt.-%, more preferably at most 0.025 wt.-%, more preferably at most 0.01 wt.-% gold, calculated as element and based on the weight of the second washcoat layer. It is most preferred that the second washcoat layer is free of gold. The term "free of gold" as used in this context of the present invention means that gold is either not contained at all or only contained in traces as impurity.

Generally, the second washcoat layer may also contain an alkaline earth metal such as barium. Generally, there are no specific restrictions as far as the barium content of the second washcoat layer is concerned. Regarding the barium content, barium is to be understood as being in its elemental form as well as being present in a barium comprising compound, such as barium oxide, barium acetate, barium hydroxide, barium carbonate and barium hydrogen carbonate. Preferably, the second washcoat layer comprises barium in an amount of from 0.01 to 3 g/inch$^3$, more preferably from 0.01 to 2 g/inch$^3$, more preferably from 0.01 to 1 g/inch$^3$, more preferably from 0.01 to 0.5 g/inch$^3$, more preferably from 0.01 to 0.1 g/inch$^3$, calculated as barium oxide.

Generally, the second washcoat layer may also contain one or more binders. In the context of the present invention, any suitable binder may be used. Preferably, inorganic binders are used, more preferably metal hydroxides, more preferably aluminum oxide hydroxides, more preferably boehmite. Preferably, the at least one binder is contained in the second washcoat layer in an amount of from 0.001 to 5 g/inch$^3$, more preferably from 0.01 to 0.1 g/inch$^3$, more preferably from 0.02 to 0.08 g/inch$^3$, more preferably from 0.04 to 0.06 g/inch$^3$.

Three Washcoat Layers

According to a preferred embodiment of the present invention, the diesel oxidation catalyst comprises a second washcoat layer disposed on the first washcoat layer, a third washcoat layer disposed on the second washcoat layer, and contains no further washcoat layer disposed on the third washcoat layer.

According to this embodiment, the second washcoat layer comprises at least one precious metal selected from the group consisting of gold, platinum, palladium, rhodium, iridium, ruthenium and osmium, preferably consisting of platinum, palladium, rhodium, iridium, ruthenium and osmium, wherein palladium, or platinum, or palladium and platinum is/are preferred. Palladium is especially preferred. Preferably, the at least one precious metal, most preferably the palladium is supported on a support material comprising a metal oxide. Preferably, the support material comprising a metal oxide is selected from the group consisting of alumina, preferably gamma-alumina, zirconia, silica, titania, silica-alumina, preferably silica-gamma-alumina, zirconia-alumina, preferably zirconia-gamma-alumina, titania-silica, titania-zirconia, titania-alumina, preferably titania-gamma-alumina, lanthana-alumina, preferably lanthana-gamma-alumina, lanthana-zirconia-alumina, preferably lanthana-zirconia-gamma-alumina, and combinations of two or more thereof. More preferably, the support material comprising a metal oxide is selected from the group consisting of alumina, preferably gamma-alumina and silica-alumina, preferably silica-gamma-alumina. Most preferably, the support material comprising a metal oxide is gamma-alumina.

According to said embodiment, there are generally no specific restrictions as far as the palladium content in the second washcoat layer is concerned. Preferably, the second washcoat layer comprises palladium in an amount of from 0.1 to 50 g/ft$^3$, more preferably from 0.5 to 20 g/ft$^3$, more preferably from 1 to 10 g/ft$^3$.

According to said embodiment, the second washcoat layer preferably comprises at least one zeolite. The at least one zeolite can be a natural or synthetic zeolite. Typically, any zeolite can be used, such as zeolites having framework structure type ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or a mixture or a mixed structure of one or more of these framework structure types. Preferably, the at least one zeolite has a BEA framework structure. Preferably, a beta zeolite is used. The zeolite can contain any suitable silica to alumina ratio. Preferably, the silica to alumina ratio is in the range of from 1:1 to 300:1, more preferably from 50:1 to 200:1, more preferably from 80:1 to 180:1. It is also conceivable that the silica to alumina ratio is at least 400:1, more preferably at least 500:1, more preferably more at least 600:1 and more preferably at least 630:1. Preferably, the zeolite is present in its H-form.

Generally, there are no specific restrictions as far as the amount of zeolite present in at least one of the at least one further washcoat layer is concerned. Preferably, the at least one zeolite is contained preferably in the second washcoat layer in an amount of from 0.001 to 10 g/inch$^3$, more preferably from 0.01 to 4 g/inch$^3$, more preferably from 0.05 to 1.5 g/inch$^3$, more preferably from 0.25 to 0.75 g/inch$^3$, more preferably from 0.4 to 0.6 g/inch$^3$.

Further according to this embodiment, the second washcoat layer preferably comprises a ceria comprising compound. The ceria comprising compound comprised in the second washcoat layer preferably contains ceria preferably in an amount of at least 90 wt.-%, based on the total weight of the compound. Apart from ceria, the ceria comprising compound may contain further components such as at least one stabilizing component. Generally, any stabilizing component known in the art as suitable stabilizing component for ceria, in particular for ceria comprised in a diesel oxidation catalyst, can be comprised in the ceria comprising compound. Preferably, the at least one stabilizing component contains at least one of the group consisting of zirconium, hafnium, tin, zinc, aluminum, silicon, a rare earth metal other than cerium, preferably selected from the group consisting of lanthanum, praseodymium and neodymium, and a combination of two or more thereof. More preferably, the at least one stabilizing component contains at least one of the group consisting of zirconium, a rare earth metal selected from the group consisting of lanthanum, praseodymium and neodymium, and a combination of two or more thereof. More preferably, the ceria comprising compound comprised in the first washcoat layer contains ceria in an amount of at least 92 wt.-%, more preferably at least 94 wt.-%, more preferably at least 96 wt.-%, more preferably at least 98 wt.-%, more preferably at least 99 wt.-%, more preferably at least 99.9 wt.-%, based on the weight of the compound. Preferably, the ceria comprising compound consists of ceria.

The ceria comprised in the ceria comprising compound preferably has a surface area of at least 50 m$^2$/g, more preferably at least 100 m$^2$/g, more preferably 120 m$^2$/g. Preferably, the surface area of the ceria comprised in the ceria comprising compound is at least 20 m$^2$/g after treatment at 900° C. for 5 h, more preferably at least 30 m$^2$/g, more preferably at least 35 m$^2$/g. The surface area refers to the BET surface area and is determined according to DIN 66135. The ceria comprised in the ceria comprising compound preferably has a pore volume of at least 0.1 cm$^3$/g, more preferably of at least 0.2 cm$^3$/g, more preferably of at least 0.3 m$^3$/g. The porosity is determined by Hg-porosimetry according to DIN 66133. The particle size of the of the ceria comprised in the ceria comprising compound is preferably in the range of from 1 to 50 micrometer, preferably from 10 to 25 micrometer (Dv90).

Preferably, the second washcoat layer comprises ceria, contained in the ceria comprising compound, in an amount of from 0.05 to 4 g/inch$^3$, more preferably from 0.1 to 1.0 g/inch$^3$, more preferably from 0.2 to 0.7 g/inch$^3$, more preferably from 0.4 to 0.6 g/inch$^3$.

In said embodiment, the second washcoat layer preferably comprises at most 0.1 wt.-%, more preferably at most 0.075 wt.-%, more preferably at most 0.05 wt.-%, more preferably at most 0.025 wt.-%, more preferably at most 0.01 wt.-% gold, calculated as element and based on the weight of the second washcoat layer. It is most preferred that the second washcoat layer is free of gold. The term "free of gold" as used in this context of the present invention means that gold is either not contained at all or only contained in traces as impurity.

In said embodiment, the second washcoat layer preferably comprises at most 0.1 wt.-%, more preferably at most 0.075 wt.-%, more preferably at most 0.05 wt.-%, more preferably at most 0.025 wt.-%, more preferably at most 0.01 wt.-% platinum, calculated as element and based on the weight of the second washcoat layer. It is most preferred that the second washcoat layer is free of platinum. The term "free of platinum" as used in this context of the present invention means that platinum is either not contained at all or only contained in traces as impurity.

Preferably, the second washcoat layer comprises barium in an amount of from 0.01 to 3 g/inch$^3$, more preferably from 0.01 to 2 g/inch$^3$, more preferably from 0.01 to 1 g/inch$^3$, more preferably from 0.01 to 0.5 g/inch$^3$, more preferably from 0.01 to 0.1 g/inch$^3$, calculated as barium oxide.

Generally, the second washcoat layer may also contain one or more binders. In the context of the present invention, any suitable binder may be used. Preferably, inorganic binders are used, more preferably metal hydroxides, more preferably aluminum oxide hydroxides, more preferably boehmite. Preferably, the at least one binder is contained in the second washcoat layer in an amount of from 0.001 to 5 g/inch$^3$, more preferably from 0.01 to 0.1 g/inch$^3$, more preferably from 0.02 to 0.08 g/inch$^3$, more preferably from 0.04 to 0.06 g/inch$^3$.

According to this embodiment, the third washcoat layer comprises at least one precious metal selected from the group consisting of gold, platinum, palladium, rhodium, iridium, ruthenium and osmium, preferably consisting of platinum, palladium, rhodium, iridium, ruthenium and osmium, wherein palladium, or platinum, or palladium and platinum is/are preferred. Preferably, the palladium is supported on a support material comprising a metal oxide and the platinum is supported on a support material comprising a metal oxide. Preferably, the support materials comprising a metal oxide are independently selected from the group consisting of alumina, preferably gamma-alumina, zirconia, silica, titania, silica-alumina, preferably silica-gamma-alumina, zirconia-alumina, preferably zirconia-gamma-alumina, titania-silica, titania-zirconia, titania-alumina, preferably titania-gamma-alumina, lanthana-alumina, preferably lanthana-gamma-alumina, lanthana-zirconia-alumina, preferably lanthana-zirconia-gamma-alumina, and combinations of two or more thereof. More preferably, the support materials comprising a metal oxide are independently selected from the group consisting of alumina, preferably gamma-alumina and silica-alumina, preferably silica-gamma-alumina.

According to said embodiment, there are generally no specific restrictions as far as the palladium and/or platinum content in the third washcoat layer are concerned. Preferably, the third washcoat layer comprises palladium in an amount of from 0.1 to 200 g/ft$^3$, more preferably from 0.5 to 50 g/ft$^3$, more preferably from 1 to 20 g/ft$^3$, more preferably from 5 to 15 g/ft$^3$. Preferably, the third washcoat layer comprises platinum in an amount of from 0.1 to 200 g/ft$^3$, more preferably from 1 to 100 g/ft$^3$, more preferably from 20 to 80 g/ft$^3$, more preferably from 30 to 60 g/ft$^3$. More preferably, the third washcoat layer comprises palladium in an amount of from 0.1 to 200 g/ft$^3$ and platinum in an amount of from 0.1 to 200 g/ft$^3$. More preferably, the third washcoat layer comprises palladium in an amount of from 0.5 to 50 g/ft$^3$ and platinum in an amount of from 1 to 100 g/ft$^3$. More preferably, the third washcoat layer comprises palladium in an amount of from 1 to 20 g/ft$^3$ and platinum in an amount of from 20 to 80 g/ft$^3$. More preferably, the third washcoat layer comprises palladium in an amount of from 5 to 15 g/ft$^3$ and platinum in an amount of from 30 to 60 g/ft$^3$.

In said embodiment, the third washcoat layer preferably comprises at most 0.1 wt.-%, more preferably at most 0.075 wt.-%, more preferably at most 0.05 wt.-%, more preferably at most 0.025 wt.-%, more preferably at most 0.01 wt.-% gold, calculated as element and based on the weight of the second washcoat layer. It is most preferred that the second washcoat layer is free of gold. The term "free of gold" as used in this context of the present invention means that gold is either not contained at all or only contained in traces as impurity.

Preferably, the third washcoat layer comprises an alkaline earth metal, preferably barium. More preferably, the third washcoat layer comprises barium in an amount of from 0.01 to 3 g/inch$^3$, more preferably from 0.01 to 2 g/inch$^3$, more preferably from 0.01 to 1 g/inch$^3$, more preferably from 0.01 to 0.1 g/inch$^3$, calculated as barium oxide.

Preferably, the washcoat layers comprised in the catalyst comprise barium, calculated as barium oxide, in total in an amount of at most 7 wt.-%, more preferably at most 6 wt.-%, more preferably at most 5 wt.-%, more preferably at most 4 wt.-%, more preferably at most 3 wt.-%, based on the total weight of the washcoat layers.

Further according to this embodiment, the third washcoat layer comprises at most 0.1 wt.-% ceria, based on the weight of the third washcoat layer. More preferably, the third washcoat layer comprises at most 0.1 wt.-%, preferably at most 0.075 wt.-%, more preferably at most 0.05 wt.-%, more preferably at most 0.025 wt.-%, more preferably at most 0.01 wt.-% of ceria, calculated as $CeO_2$ and based on the weight of the third washcoat layer. It is most preferred that the third washcoat layer is free of ceria. The term "free of ceria" as used in this context of the present invention means that ceria is either not contained at all or only contained in traces as impurity.

Further according to this embodiment, the third washcoat layer comprises at most 0.1 wt.-% zeolite, preferably at most 0.075 wt.-%, more preferably at most 0.05 wt.-%, more preferably at most 0.025 wt.-%, even more preferably at most 0.01 wt.-%. It is most preferred that the third washcoat layer is free of zeolite. The term "free of zeolite" as used in this context of the present invention means that zeolite is either not contained at all or only contained in traces as impurity.

Process for the Preparation

The present invention further relates to a process for the preparation of a diesel oxidation catalyst comprising
a) providing a carrier substrate,
b) applying a first washcoat layer onto the substrate by impregnating the substrate with a mixture comprising palladium supported, preferably impregnated on a support material comprising a metal oxide, gold supported, preferably impregnated on a support material comprising a metal oxide, and a ceria comprising compound, optionally followed by calcination, preferably carried out at a temperature in the range of from 450 to 700° C.;
c) optionally applying a second washcoat onto the substrate obtained from b), having disposed thereon the first washcoat layer, optionally followed by calcination, preferably carried out at a temperature in the range of from 450 to 700° C.;
d) optionally applying a third washcoat onto the substrate obtained from c), having disposed thereon the first washcoat layer and disposed on the first washcoat layer the second washcoat layer, optionally followed by calcination, preferably carried out at a temperature in the range of from 450 to 700° C.;
e) optionally applying further washcoat onto the substrate obtained from d) having disposed thereon the first washcoat layer, disposed on the first washcoat layer the second washcoat layer and disposed on the second washcoat layer the third washcoat layer, optionally followed by calcination, preferably carried out at a temperature in the range of from 450 to 700° C.;
wherein preferably, either only the first, or only the first and the second, or only the first and the second and the third washcoat are applied.

As far as the generally conceivable and preferred carrier substrate and the generally conceivable and preferred components of the individual washcoat layers are concerned, reference is made to the respective disclosure and discussion hereinabove with regard to the catalyst as such.

According to the process according to the present invention, the washcoat layers may be applied on the carrier substrate, or on the carrier substrate having disposed thereon one or more washcoat layers, by any means commonly used in the art, wherein preferably a washcoat layer is applied by a dip coating procedure. In general, the preferred dip coating procedure may be conducted once to apply the washcoat layer in question, and may be repeated as many times as necessary for achieving the desired loading of said washcoat layer.

Preferably, the application of a washcoat layer on the substrate is followed by a drying step. Concerning the drying step, the temperature and duration of said procedure are generally chosen such that the resulting dried product is essentially devoid of any solvent employed in the coating procedure. Preferably, the drying temperature is in the range of from 80 to 400° C. If the drying step is carried out under laboratory conditions, the drying temperature is preferably in the range of from 80 to 130° C., more preferably from 90 to 120° C., wherein the drying step is preferably carried for 10 to 60 minutes, more preferably 20 to 40 minutes, more preferably 25 to 35 minutes. If carried out under industrial conditions, the drying temperature is preferably in the range of from 90 to 420° C., more preferably from 200 to 410° C., more preferably from 250 to 400° C., more preferably from 300 to 350° C., wherein the drying step is preferably carried for 0.1 to 10 minutes, more preferably from 0.5 to 5 minutes, more preferably from 1 to 3 minutes.

After drying, a calcination step is optionally carried out. Preferably, calcination is carried out. Concerning the calcination procedure in steps b), c), d) and/or e) according to the process of the present invention, the temperature and duration of said procedure are generally chosen such that a product is obtained which shows the chemical and physical transformation typical to the calcination process. Preferably, the temperature at which the calcination procedure is carried out is in the range of from 450 to 700° C., more preferably from 500 to 670° C., more preferably from 550 to 630° C., more preferably from 575 to 605° C., more preferably of 585 to 595° C. The calcination is preferably carried out in an atmosphere of oxygen, nitrogen, air or lean air or mixtures thereof.

According to a preferred embodiment of the present invention, the inventive process comprises
a) providing a carrier substrate,
b) applying a first washcoat layer onto the substrate by impregnating the substrate with a mixture comprising palladium supported, preferably impregnated on a support material comprising a metal oxide, gold supported, preferably impregnated on a support material comprising a metal oxide, and a ceria comprising compound, optionally followed by calcination, preferably carried out at a temperature in the range of from 450 to 700° C.;
c) applying a second washcoat onto the substrate obtained from b), having disposed thereon the first washcoat layer, optionally followed by calcination, preferably carried out at a temperature in the range of from 450 to 700° C.;
wherein after c), no further washcoat layer is applied.

According to a further preferred embodiment of the present invention, the inventive process comprises
a) providing a carrier substrate,
b) applying a first washcoat layer onto the substrate by impregnating the substrate with a mixture comprising palladium supported, preferably impregnated on a support material comprising a metal oxide, gold supported, preferably impregnated on a support material comprising a metal oxide, and a ceria comprising compound, optionally followed by calcination, preferably carried out at a temperature in the range of from 450 to 700° C.;
wherein after b), no further washcoat layer is applied.

According to a further preferred embodiment of the present invention, the inventive process comprises
a) providing a carrier substrate,
b) applying a first washcoat layer onto the substrate by impregnating the substrate with a mixture comprising palladium supported, preferably impregnated on a support material comprising a metal oxide, gold supported, preferably impregnated on a support material comprising a metal oxide, and a ceria comprising compound, optionally followed by calcination, preferably carried out at a temperature in the range of from 450 to 700° C.;
c) applying a second washcoat onto the substrate obtained from b), having disposed thereon the first washcoat layer, optionally followed by calcination, preferably carried out at a temperature in the range of from 450 to 700° C.;
d) applying a third washcoat onto the substrate obtained from c), having disposed thereon the first washcoat layer and disposed on the first washcoat layer the second washcoat layer, optionally followed by calcination, preferably carried out at a temperature in the range of from 450 to 700° C.;
wherein after d), no further washcoat layer is applied.

Preferably, a washcoat layer according to the present invention is applied by impregnating a slurry onto the carrier substrate, optionally having disposed thereon at least one washcoat layer, wherein said slurry contains all components of the washcoat layer to be applied.

Prior to the application, the slurry can be subjected to milling in order to obtain particles contained in the slurry having the suitable size. If so desired, a given slurry can be divided prior to application into two or more batches, and each batch is subjected to milling. If different batches are subjected to different milling steps, it is possible, for example, to provide batches with particles having different sizes. The different batches are preferably combined, and a slurry to be applied is obtained having particles of different size.

Preferably, the solids contained in the mixture according to b), and in the first washcoat after application of the mixture on the carrier substrate, have a particle size Dv90 in the range of from 0.1 to 50 micrometer, more preferably from 1 to 20 micrometer, more preferably from 4 to 15 micrometer, more preferably from 6 and 10 micrometer.

Preferably, the solids contained in the mixture according to c), d) and e), and in the second, third, or further washcoat layers, have a particle size Dv90 which is preferably larger than the particle size of the particles in the mixture according to b) and in the first washcoat layer, and is more preferably in the range of from 1 to 50 micrometer, more preferably from 5 to 35 micrometer, more preferably from 10 to 20 micrometer.

Preferably, a given slurry to be applied contains at least one reducing agent for the precious metal salts such as a platinum salt, a palladium salt, and/or a gold salt preferably also contained in said slurry. In particular, the use of a reducing agent is preferred for the preparation of the mixture according to b), i.e. for the preparation of the slurry for the first washcoat layer. Every suitable reducing agent can be used. Preferably, a borohydride such as sodium borohydride is used. Further, the reducing agent may comprise one or more suitable components. As to the preferred sodium borohydride, the reducing agent may additionally comprise $N_2H_4$ and/or a base such as a hydroxide like sodium hydroxide.

Preferably, a support material comprising a metal oxide being used for the first washcoat layer, such as lanthana-gamma-aluminum oxide, is impregnated with a salt comprising palladium, such as palladium chloride or palladium nitrate, and a salt comprising gold, such as chloroauric acid (HAuCl$_4$), subsequently or simultaneously, preferably simultaneously. It is preferred that the total amount of metals is at most 5 wt.-%, more preferably at most 4 wt.-%, more preferably at most 3 wt.-%, more preferably at most 2 wt.-%, based on the weight of the support material comprising a metal oxide. Subsequently, the impregnated support material is subjected to the above described reducing step. It is preferred that subsequently the slurry is filtered and the filter cake is washed with deionized water until the filtrate is substantially free of anions. It is preferred that the resulting material is then brought in contact with a ceria comprising compound in order to form a slurry suitable to be used for the first washcoat layer of the present catalyst. Therefore, it is preferred that the support material comprising a metal oxide being used for the first washcoat layer is i) simultaneously impregnated with a salt comprising palladium and a salt comprising gold, wherein the total amount of metals is preferably at most 2 wt.-%, based on the weight of the support material comprising a metal oxide, and that the product is ii) subjected to a reducing procedure and iii) extensively washed with deionized water.

In a further embodiment regarding the present process for preparing a diesel oxidation catalyst, it is preferred that for the preparation of the mixture according to b), no barium hydroxide, in particular no alkaline earth metal hydroxide is employed for precipitating the palladium. Therefore, preferably, the palladium comprised in the mixture according to b) has not been precipitated with barium hydroxide, preferably with an alkaline earth metal hydroxide. It is also conceivable that a binder is additionally added to the mixture. In the context of the present invention, any suitable binder may be added. Preferably, inorganic binders are used, more preferably metal hydroxides, more preferably aluminum oxide hydroxides, more preferably boehmite.

Treatment System

Further, the present invention also relates to a system for treating a gaseous exhaust stream of a diesel engine. In particular, the system of the present invention comprises
an exhaust conduit in fluid communication with the diesel engine via an exhaust manifold, the diesel oxidation catalyst according to the present invention or obtained or obtained by the process according to the present invention, wherein the carrier substrate is a wall-flow substrate or a flow through substrate, and
one or more of the following in fluid communication with the layered diesel oxidation catalyst composite: a catalyzed soot filter (CSF), a selective catalytic reduction (SCR) article, a NOx storage and reduction (NSR) catalytic article.

In addition to treating the exhaust gas emissions via the use of a diesel oxidation catalyst, the system according to the present invention may contain a soot filter for removal of particulate matter. The soot filter may be located upstream or downstream from the diesel oxidation catalyst. Preferably, it is located downstream of the diesel oxidation catalyst. In a preferred embodiment, the soot filter is a catalyzed soot filter (CSF). Any suitable CSF can be used according to the present invention.

Preferably, the CSF comprises a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., alumina, silica, silica alumina, zirconia, and zirconia-alumina) and/or an oxidation catalyst (e.g., a ceria-zirconia) for the combustion of unburned hydrocarbons and to some degree particulate matter. However, preferably the soot burning catalyst is an oxidation catalyst comprising one or more precious metal catalysts (platinum, palladium, and/or rhodium).

The exhaust gas treatment system of the present invention may further comprise a selective catalytic reduction (SCR) component. The SCR component may be located upstream or downstream of the DOC and/or the CSF. A suitable SCR catalyst component for use in the emission treatment system is able to effectively catalyze the reduction of the NOx component at temperatures below 600° C., so that adequate NOx levels can be treated even under conditions of low load which typically are associated with lower exhaust temperatures. Preferably, the catalyst article is capable of converting at least 50% of the NOx component to $N_2$, depending on the amount of reductant added to the system. Another desirable attribute for the composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream CSF.

Suitable SCR catalyst compositions are described, for instance, in U.S. Pat. Nos. 4,961,917 and 5,516,497. Suitable compositions include one or both of an iron and a copper promoter present in a zeolite in an amount of from 0.1 to 30 wt.-%, preferably from 1 to 5 wt.-%, of the total weight of promoter plus zeolite. In addition to their ability to catalyze the reduction of NOx with $NH_3$ to $N_2$, the disclosed compositions can also promote the oxidation of excess $NH_3$ with $O_2$, especially for those compositions having higher promoter concentrations.

The exhaust gas treatment system of the present invention may further comprise a NOx-trap. The NOx-trap may be located upstream or downstream of the DOC and/or the CSF. Preferably, the NOx-trap is located downstream of the CSF. According to the present invention, any suitable NOx-trap can be used.

The present invention is further characterized by the following embodiments and combinations of embodiments indicated by the respective dependencies:

1. A diesel oxidation catalyst comprising:
    a carrier substrate, and
    a first washcoat layer disposed on the substrate, the first washcoat layer comprising palladium supported on a support material comprising a metal oxide, gold supported on a support material comprising a metal oxide, and a ceria comprising compound.
2. The diesel oxidation catalyst according to embodiment 1, wherein the first washcoat layer comprises palladium in an amount of from 0.1 to 200 g/ft$^3$, preferably from 1 to 100 g/ft$^3$, more preferably from 10 to 50 g/ft$^3$, gold in an amount of from 0.1 to 100 g/ft$^3$, preferably from 1 to 80 g/ft$^3$, more preferably from 20 to 60 g/ft$^3$ and ceria, contained in the ceria comprising compound, in an amount of from 0.001 to 10 g/inch$^3$.
3. The diesel oxidation catalyst according to embodiment 1 or 2, wherein the first washcoat layer comprises at most 0.1 wt.-% platinum, calculated as element and based on the weight of the first washcoat layer.
4. The diesel oxidation catalyst according to any of embodiments 1 to 3, wherein the first washcoat layer comprises at most 0.1 wt.-% zeolite, based on the weight of the first washcoat layer.
5. The diesel oxidation catalyst according to any of embodiments 1 to 4, wherein the first washcoat layer comprises at most 1 wt.-% barium, calculated as barium oxide and based on the weight of the first washcoat layer.
6. The diesel oxidation catalyst according to any of embodiments 1 to 5, wherein the support material on which the palladium is supported comprises a metal oxide selected from the group consisting of alumina, preferably gamma-alumina, zirconia, silica, titania, silica-alumina, zirconia-alumina, titania-silica, titania-zirconia, titania-alumina, lanthana-alumina, lanthana-zirconia-alumina, and combinations of two or more thereof, said support material preferably comprising alumina and/or lanthana-alumina, more preferably gamma-alumina and/or lanthana-gamma-alumina, and wherein the support material on which the gold is supported comprises a metal oxide selected from the group consisting of alumina, preferably gamma-alumina, zirconia, silica, titania, silica-alumina, zirconia-alumina, titania-silica, titania-zirconia, titania-alumina, lanthana-alumina, lanthana-zirconia-alumina, and combinations of two or more thereof, said support material preferably comprising alumina and/or lanthana-alumina, more preferably gamma-alumina and/or lanthana-gamma-alumina.
7. The diesel oxidation catalyst according to any of embodiments 1 to 6, wherein the ceria comprising compound contains ceria in an amount of at least 90 wt.-%, based on the weight of the compound, and optionally contains at least one stabilizing component, preferably selected from the group consisting of zirconium, hafnium, tin, zinc, aluminum, silicon, a rare earth metal other than cerium preferably selected from the group consisting of lanthanum, praseodymium and neodymium, and a combination of two or more thereof, more preferably selected from the group consisting of zirconium, a rare earth metal other than cerium and a combination of two or more thereof.
8. The diesel oxidation catalyst according to any of embodiments 1 to 7, comprising no further washcoat layer disposed on the first washcoat layer.
9. The diesel oxidation catalyst according to any of embodiments 1 to 7, comprising at least one further washcoat layer disposed on the first washcoat layer, wherein at least one of the at least one further washcoat layer comprises a zeolite and at least one of the at least one further washcoat layer comprises at least one precious metal selected from the group consisting of platinum, palladium, rhodium, iridium, ruthenium and osmium, wherein the precious metal is supported on a support material comprising a metal oxide, preferably comprising a metal oxide selected from the group consisting of alumina, preferably gamma-alumina, zirconia, silica, titania, silica-alumina, zirconia-alumina, titania-silica, titania-zirconia, titania-alumina, lanthana-alumina, lanthana-zirconia-alumina, and combinations of two or more thereof.
10. The diesel oxidation catalyst according to embodiment 9, wherein at least one of the at least one further washcoat layer comprises two different precious metals, preferably platinum and palladium.
11. The diesel oxidation catalyst according to any of embodiments 9 to 10, wherein the metal oxide is silica-gamma-alumina preferably having a silica content of at most 5 wt.-% based on the silica-gamma-alumina.
12. The diesel oxidation catalyst according to any of embodiments 9 to 11, wherein none of the at least one further washcoat layer comprises more than 0.1 wt.-% gold, calculated as element and based on the weight of the further washcoat layer.
13. The diesel oxidation catalyst according to any of embodiments 9 to 12 comprising a second washcoat layer disposed on the first washcoat layer, the second washcoat layer comprising palladium, or platinum, or palladium and platinum, and comprising a zeolite, wherein the palladium is supported on a support material comprising a metal oxide, and wherein the platinum is supported on a support material comprising a metal oxide, wherein preferably, the support materials comprising a metal oxide are independently selected from the group consisting of alumina, preferably gamma-alumina, zirconia, silica, titania, silica-alumina, zirconia-alumina, titania-silica, titania-zirconia, titania-alumina, lanthana-alumina, lanthana-zirconia-alumina, and combinations of two or more thereof,
wherein the diesel oxidation catalyst preferably contains no further washcoat layer disposed on the second washcoat layer.
14. The diesel oxidation catalyst according to embodiment 13, wherein the second washcoat layer comprises palladium in an amount of from 0.1 to 200 g/ft$^3$, preferably from 0.5 to 50 g/ft$^3$, more preferably from 1 to 20 g/ft$^3$, and/or platinum in an amount of from 0.1 to 200 g/ft$^3$, preferably from 1 to 100 g/ft$^3$, more preferably from 20 to 80 g/ft$^3$.
15. The diesel oxidation catalyst according to embodiment 13 or 14, wherein the second washcoat layer comprises at most 0.1 wt.-% ceria, based on the weight of the second washcoat layer, and/or at most 0.1 wt.-% gold, calculated as element and based on the weight of the second washcoat layer.
16. The diesel oxidation catalyst according to any of embodiments 9 to 12 comprising
a second washcoat layer disposed on the first washcoat layer, the second washcoat layer comprising palladium supported on a support material comprising a metal oxide and/or platinum supported on a support material comprising a metal oxide, the second washcoat layer further comprising a zeolite, and
a third washcoat layer disposed on the second washcoat layer, the third washcoat layer comprising palladium supported on a support material comprising a metal oxide, and/or platinum supported on a support material comprising a metal oxide,
wherein preferably, the support materials comprising a metal oxide of the second and the third washcoat layer are independently selected from the group consisting of alumina, zirconia, silica, titania, silica-alumina, zirconia-alumina, titania-silica, titania-zirconia, titania-alumina, lanthana-alumina, lanthana-zirconia-alumina, and combinations of two or more thereof,
wherein the diesel oxidation catalyst preferably contains no further washcoat layer disposed on the third washcoat layer.
17. The diesel oxidation catalyst according to embodiment 16, wherein the second washcoat layer comprises palladium in an amount of from 0.1 to 50 g/ft$^3$, more preferably from 0.5 to 20 g/ft$^3$, more preferably from 1 to 10 g/ft$^3$.
18. The diesel oxidation catalyst according to embodiment 16 or 17, wherein the second washcoat layer comprises at least one zeolite, wherein the at least one zeolite is contained in the second washcoat layer preferably in an amount of from 0.001 to 10 g/inch$^3$, more preferably from 0.01 to 4 g/inch$^3$, more preferably from 0.05 to 1.5 g/inch$^3$, more preferably from 0.25 to 0.75 g/inch$^3$, more preferably from 0.4 to 0.6 g/inch$^3$.
19. The diesel oxidation catalyst according to any of embodiments 16 to 18, wherein the second washcoat layer comprises a ceria comprising compound, wherein the second washcoat layer comprises ceria, contained in the ceria comprising compound, preferably in an amount of from 0.05 to 4 g/inch$^3$, more preferably from 0.1 to 1.0 g/inch$^3$, more preferably from 0.2 to 0.7 g/inch$^3$, more preferably from 0.4 to 0.6 g/inch$^3$.
20. The diesel oxidation catalyst according to any of embodiments 16 to 19, wherein the third washcoat layer comprises palladium in an amount of from 0.1 to 200 g/ft$^3$, preferably from 0.5 to 50 g/ft$^3$, more preferably from 1 to 20 g/ft$^3$, and/or platinum in an amount of from 0.1 to 200 g/ft$^3$, preferably from 10 to 80 g/ft$^3$, more preferably from 30 to 60 g/ft$^3$.
21. The diesel oxidation catalyst according to any of embodiments 16 to 20, wherein the third washcoat layer comprises at most 0.1 wt.-% of a ceria comprising compound, based on the weight of the third washcoat layer.
22. The diesel oxidation catalyst according to any of embodiments 16 to 21, wherein the third washcoat layer comprises at most 0.1 wt.-% zeolite, based on the weight of the third washcoat layer.
23. The diesel oxidation catalyst according to any of embodiments 16 to 22, wherein the third washcoat comprises barium, preferably in an amount of from 0.01 to 3 g/inch$^3$, more preferably from 0.01 to 2 g/inch$^3$, more preferably from 0.01 to 1 g/inch$^3$, calculated as barium oxide.
24. A process for the preparation of diesel oxidation catalyst according to any of embodiments 1 to 23, said process comprising
    a) providing a carrier substrate,
    b) applying a first washcoat layer on the substrate by impregnating the substrate with a mixture comprising palladium supported, preferably impregnated on a support material comprising a metal oxide, gold supported, preferably impregnated on a support material comprising a metal oxide, and a ceria comprising compound, optionally followed by calcination, preferably carried out at a temperature in the range of from 450 to 700° C.;
    c) optionally applying a second washcoat onto the substrate obtained from b), having disposed thereon the first washcoat layer, optionally followed by calcination, preferably carried out at a temperature in the range of from 450 to 700° C.;
    d) optionally applying a third washcoat onto the substrate obtained from c), having disposed thereon the first washcoat layer and disposed on the first washcoat layer the second washcoat layer, optionally followed by calcination, preferably carried out at a temperature in the range of from 450 to 700° C.;
    e) optionally applying further washcoat onto the substrate obtained from d) having disposed thereon the first washcoat layer, disposed on the first washcoat layer the second washcoat layer and disposed on the second washcoat layer the third washcoat layer, optionally followed by calcination, preferably carried out at a temperature in the range of from 450 to 700° C.;
wherein preferably, either only the first, or only the first and the second, or only the first and the second and the third washcoat are applied.
25. The process according to embodiment 24, wherein the palladium comprised in the mixture according to b) has not been precipitated with barium hydroxide.
26. The process of embodiment 24 or 25 comprising c), or c) and d), or c) and d) and e), wherein at least one of the second, third, or further washcoats comprises a zeolite and at least one of the second, third, or further washcoats comprises a precious metal selected from the group consisting of platinum, palladium, rhodium, iridium, ruthenium and osmium, wherein the precious metal is supported, preferably impregnated on a support material comprising a metal oxide.
27. The process of embodiment 26, wherein none of the second, third, and further washcoats contains more than 0.1 wt.-% gold, calculated as element and based on the weight of the respective washcoat layer.
28. The process of any of embodiments 24 to 27, wherein the solids comprised in the second, third, or further washcoats have a particle size in the range of from 1 to 50 micrometer, preferably from 10 to 20 micrometer.
29. A system for treating a gaseous exhaust stream of a diesel engine, the system comprising:
    an exhaust conduit in fluid communication with the diesel engine via an exhaust manifold,
    the diesel oxidation catalyst according to any of embodiments 1 to 23, wherein the carrier substrate is a wall-flow substrate or a flow through substrate, and
    one or more of the following in fluid communication with the layered diesel oxidation catalyst composite: a catalyzed soot filter (CSF), a selective catalytic reduction (SCR) article, a NOx storage and reduction (NSR) catalytic article.

The present invention is further illustrated by the following examples and comparative examples. According to the present invention, the abbreviation "wt.-%" stands for "weight-%".

EXAMPLES

Example 1

Diesel Oxidation Catalyst Comprising One Washcoat Layer 1.1 Preparation of a Slurry High surface area gamma alumina (1.16 g/inch$^3$; BET surface area: approximately 150 m$^2$/g; pore volume: approximately 1.2 cm$^3$/g) comprising 1.7 wt.-% of palladium and 2 wt.-% of gold was prepared according to a process as described in EP 1 938 893 A2, page 7, lines 6 to 24, paragraph [0041].

The resulting Pd/Au/alumina material thus obtained was mixed with deionized water to obtain a slurry of 45 wt.-% solids. Subsequently, 0.4 g/inch$^3$ Ceria (HSA20, commercially available CeO$_2$ from Rhodia®) were added, and the pH was adjusted to a value of from 4 to 4.5 using acetic acid. The such obtained slurry was milled to obtain particles of which 90% have a particle size of less than 8 micrometer (Dv90).

1.2 Coating

This slurry was coated onto a cordierite carrier substrate (volume of 75.5 inch$^3$ (1.24 L), cell density of 400 cells per square inch, wall thickness of approximately 150 micrometer) via dip coating (commercially available from NGK) After coating, the coated substrate was dried at a temperature of 110° C. for 30 min and then calcined at a temperature of 500° C. for 1 hour.

Example 2

Diesel Oxidation Catalyst Comprising Two Washcoat Layers

First Washcoat

The slurry for the first washcoat layer was prepared as described in Example 1.1.

Second Washcoat

High surface area gamma-alumina doped with 5 wt.-% silica (1.1 g/inch$^3$; BET surface: approximately 150 m$^2$/g; pore volume: approximately: 1.2 cm$^3$/g, commercially available from SASOL) were loaded with 2.4 wt.-% platinum and 0.6 wt.-% palladium as follows.

Palladium (11.25 g/ft$^3$) in the form of an aqueous palladium nitrate solution were impregnated onto the doped gamma-alumina by use of a planetary mixer (P-mixer) to form a wet powder (incipient wetness). Subsequently, barium hydroxide (two molar equivalents relative to the palladium nitrate) and deionized water were added to obtain a slurry of 28 wt.-% solids at a pH of above 8. To this slurry, platinum (45 g/ft$^3$) in the form of an aqueous solution of hexahydroxy platinum acid H$_2$Pt(OH)$_6$ (15 wt.-% platinum, calculated as the element) in the presence of monoethanolamine was added within 5 min. Then, zeolite (0.50 g/ft$^3$; H-Beta (SAR (molar silica:alumina ratio) 100-170) and USZ1, respectively: cf. table 1) were added to the slurry in order to achieve a concentration of 0.5 g/inch$^3$.

Subsequently, the pH was adjusted to 4 with tartaric acid. Then, 65% of the slurry were milled to obtain a slurry with particles 50% of which had a particle size of less than 11 micrometer (slurry 1). The remaining slurry (35%) was milled to obtain a slurry with particles 90% of which had a particle size of less than 12 micrometer (slurry 2). Then, slurry 1 was combined with slurry 2.

Deposition of the Washcoat Layers

In order to prepare a diesel oxidation catalyst comprising two washcoat layers, the first washcoat layer was coated onto a cordierite carrier substrate (volume of 75.5 in$^3$ (1.24 L), cell density of 400 cells per square inch, wall thickness of approximately 150 micrometer) via dip coating (commercially available from NGK) After coating, the coated substrate was dried at a temperature of 110° C. for 30 min and then calcined at a temperature of 500° C. for 1 hour to obtain the carrier substrate with the first washcoat layer disposed thereon.

Subsequently, the combined slurries (slurry 1 and slurry 2 described above) were coated onto the carrier substrate with the first washcoat layer disposed thereon via dip coating. After coating, the coated substrate was dried at a temperature of 110° C. for 30 min and then calcined at a temperature of 500° C. for 1 hour to obtain the carrier substrate with the second washcoat layer disposed on the first washcoat layer.

The 2-layer catalysts had the following composition:

TABLE 1

Composition of 2-layer catalysts

| | g/ft$^3$ | g/inch$^3$ | | g/ft$^3$ | g/inch$^3$ |
|---|---|---|---|---|---|
| Second washcoat layer | | | Second washcoat layer | | |
| Pt | 45.00 | 0.03 | Pt | 45.00 | 0.03 |
| Pd | 11.25 | 0.01 | Pd | 11.25 | 0.01 |
| Au | 0.00 | 0.00 | Au | 0.00 | 0.00 |
| Zeolite USZ1[1] | | 0.50 | Zeolite H-Beta | | 0.50 |
| Siralox ® 5/180[2] | | 1.10 | Siralox ® 5/180[2] | | 1.10 |
| Dispal ®[3] | | 0.05 | Dispal ®[3] | | 0.05 |
| First washcoat layer | | | First washcoat layer | | |
| Pt | 0.00 | 0.00 | Pt | 0.00 | 0.00 |
| Pd | 33.37 | 0.02 | Pd | 33.37 | 0.02 |
| Au | 40.00 | 0.02 | Au | 40.00 | 0.02 |

TABLE 1-continued

Composition of 2-layer catalysts

| | g/ft$^3$ | g/inch$^3$ | | g/ft$^3$ | g/inch$^3$ |
|---|---|---|---|---|---|
| Alu NS[4] | | 1.16 | Alu NS[4] | | 1.16 |
| HSA 20[5] | | 0.40 | HSA 20[5] | | 0.40 |

[1] commercially available from Zeolyst.
[2] alumina with 5 wt.-% SiO$_2$ and 180 m$^2$/g BET surface area (from SASOL)
[3] Disperal ® Alumina 23N4-80 (from Sasol)
[4] 2 wt.-% Pd and 2 wt.-% Au impregnated onto TM100/150 (gamma-alumina from Sasol)
[5] high-surface area ceria (from Rhodia)

The layered catalyst composite contained platinum, palladium and gold with a total precious metal loading of 130 g/ft$^3$ and with a Pt/Pd/Au ratio of 45/45/40.

Example 3

Diesel Oxidation Catalyst Comprising Three Washcoat Layers

First Washcoat Slurry

The slurry for the first washcoat layer was prepared as described in Example 1.1. A further slurry was prepared according to the recipe without ceria (comparative example).

Second Washcoat Slurry 0.25 g/inch$^3$ gamma-alumina (commercially available as TM100/150 from Sasol) were mixed with 0.5 g/inch$^3$ ceria (HSA20, commercially available CeO$_2$ from Rhodia®), and deionized water was added to obtain a slurry having a solids content of 40 wt.-%. To this slurry, an aqueous palladium nitrate solution was added to achieve a concentration of 8 g/ft$^3$ in the final catalyst. Afterwards the pH was adjusted to a value of 4 with tartaric acid.

In a second batch, 0.5 g/inch$^3$ H-Beta zeolite (SAR (molar silica:alumina ratio) 100-170) were mixed with deionized water to obtain a slurry having a solids content of 40 wt.-%. The slurry was stirred for 30 min. This slurry was added to the Pd/alumina/ceria slurry described above, and 0.05 g/inch$^3$ boehmite binder (commercially available as Disperal® Alumina 23N4-80) were added. The obtained slurry was milled to obtain particles of which 90% had a particle size in the range of from 14 to 16 micrometer.

Third Washcoat Slurry 1.1 g/inch$^3$ high surface area gamma-alumina (BET surface area: approx. 150 m$^2$/g; pore volume: approx. 1.2 cm$^3$/g; doped with 5 wt.-% of silica, commercially available as Siralox® 5/180 from Sasol) were used as support material and loaded with 2.4 wt.-% of platinum and 0.6 wt.-% of palladium as follows:

Palladium (11.25 g/ft$^3$) in the form of a palladium nitrate solution was impregnated onto the gamma-alumina using a planetary mixer (P-mixer) to form a wet powder (incipient wetness). Subsequently, twice the amount of barium hydroxide and deionized water was added to obtain a slurry having a solids content of 28 wt.-% solid and a pH of above 8. To this slurry, platinum (45.0 g/ft$^3$) in the form of an aqueous solution of hexahydroxy platinum acid H$_2$Pt(OH)$_6$ (15 wt.-% platinum, calculated as the element) in the presence of monoethanolamine was added within 5 min.

Deposition of the Washcoat Layers

In order to prepare a diesel oxidation catalyst comprising two washcoat layers, the first washcoat layer was coated onto a cordierite carrier substrate (volume of 75.5 inch$^3$ (1.24 L), cell density of 400 cells per square inch, wall thickness of approximately 150 micrometer) via dip coating (commercially available from NGK) After coating, the coated substrate was dried at a temperature of 110° C. for 30 min and then calcined at a temperature of 500° C. for 1 hour to obtain the carrier substrate with the first washcoat layer disposed thereon. Subsequently, the slurry for the second washcoat layer was coated onto the carrier substrate with the first washcoat layer disposed thereon via dip coating. After coating, the coated substrate was dried at a temperature of 110° C. for 30 min and then calcined at a temperature of 590° C. for 1 hour to obtain the carrier substrate with the second washcoat layer disposed on the first washcoat layer.

Subsequently, the slurry for the third washcoat layer was coated onto the carrier via dip coating with the second washcoat layer disposed on the first washcoat layer and the first washcoat layer disposed on the substrate. After coating, the coated substrate was dried at a temperature of 110° C. for 30 min and then calcined at a temperature of 590° C. for 1 hour to obtain the carrier substrate with the third washcoat layer disposed on the second washcoat layer and the second washcoat layer disposed on the first washcoat layer.

The 3-layer catalyst thus obtained had the following composition:

TABLE 2

Composition of 3-layer catalysts

| | Comparative | | According to the invention | |
|---|---|---|---|---|
| | g/ft³ | g/inch³ | g/ft³ | g/inch³ |
| Third washcoat layer | | | | |
| Pt | 45.00 | 0.03 | Pt 45.00 | 0.03 |
| Pd | 11.25 | 0.01 | Pd 11.25 | 0.01 |
| Au | 0.00 | 0.00 | Au 0.00 | 0.00 |
| Siralox 5/180[1)] | | 1.50 | Siralox 5/180[1)] | 1.50 |
| Ba(OH)$_2$ | | 0.05 | Ba(OH)$_2$ | 0.05 |
| Second washcoat layer | | | | |
| Pt | 0.00 | 0.00 | Pt 0.00 | 0.00 |
| Pd | 8.00 | 0.00 | Pd 8.00 | 0.00 |
| Au | 0.00 | 0.00 | Au 0.00 | 0.00 |
| TM 100/150[5)] | | 0.25 | TM 100/150[5)] | 0.25 |
| Zeolite H-Beta[6)] | | 0.50 | Zeolite H-Beta [6)] | 0.50 |
| HSA20[4)] | | 0.50 | HSA20[4)] | 0.50 |
| Dispal[2)] | | 0.05 | Dispal[2)] | 0.05 |
| First washcoat layer | | | | |
| Pt | 0.00 | 0.00 | Pt 0.00 | 0.00 |
| Pd | 32.00 | 0.02 | Pd 32.00 | 0.02 |
| Au | 40.00 | 0.02 | Au 40.00 | 0.02 |
| Alu NS[3)] | | 1.16 | Alu NS[3)] | 1.16 |
| HSA20[4)] | | 0.00 | HSA20[4)] | 0.40 |

[1)]alumina with 5 wt.-% SiO$_2$ and 180 m²/g BET surface area (from SASOL)
[2)]Disperal ® Alumina 23N4-80 (from Sasol)
[3)]2 wt.-% Pd and 2 wt.-% Au impregnated onto TM100/150 (gamma-alumina from Sasol)
[4)]high-surface area ceria (from Rhodia)
[5)]gamma-alumina, commercially available from Sasol
[6)]zeolite beta in H-form, from BASF Example 4

Catalytic Tests

The catalysts were tested in a tube reactor, wherein the reactor tube contained a coated cordierite core sample with a diameter of 1 inch and a length of 3 inch. The gases were mixed and electrically heated to the respective temperature and conducted into the thermally insulted tube. Thermocouples were used 1 inch (2.54 cm) before and after the reactor to control the catalyst temperature. The reaction gases were measured and analyzed with a FTIR.

Diesel Oxidation Catalyst Comprising One Washcoat Layer

The catalyst according to Example 1 was steam aged for 20 h at 750° C. with a mixture of 10 vol.-% steam and 90 vol.-% nitrogen. Then it was heated to 300° C. for 10 min prior to every run and allowed to cool to 140° C. Subsequently, the catalyst was tested under a nitrogen flow (GHSV=70,000/h) comprising 1,600 vol.-ppm CO, 100 vol.-ppm NO, 4 vol.-% H$_2$O and 550 vol.-ppm THC (total hydrocarbon; therein: 45 vol.-% propylene, 27.5 vol.-% toluene and 27.5 vol.-% decane). The temperature was increased from 140° C. to 400° C. by 15 K/min.

The gas hourly space velocity (GHSV) represents the ratio of the volumetric flow rate of the reactants entering the respective reactor and the volume of the reactor itself.

The following results were obtained:

TABLE 3

Results of catalytic test (1-layer catalyst)

| Sample | CO T50 ppm Basis (° C.) | Propylene T50 (° C.) | Toluene T50 (° C.) |
|---|---|---|---|
| Pd/Au | 185 | 194 | 192 |
| Pd/Au/Ceria | 180 | 194 | 191 |

The results clearly show a marked decrease in T50 temperatures for CO and a decrease for toluene for the catalyst according to the invention, while the value for propylene remains constant. The term "T50" represents the temperature at which the conversion of the respective compound has a value of 50%. Hydrocarbons were detected by a flame ionization detector, while CO was detected by infrared spectroscopy.

Diesel Oxidation Catalyst Comprising Two and Three Washcoat Layers

The catalysts according to Example 2 as well as Example 3 (according to the invention and comparative) were subjected to the following tests.

Prior to testing, the samples were aged in the exhaust stream of a 4 cylinder light duty diesel engine with 2.7 L engine displacement for 25 h. The engine was mounted in a state of the art engine bench. The temperature of the exhaust stream was raised using an upstream burner-DOC such that the catalysts were aged to 750° C. steady state. The space velocity was 80,000/h.

The EU-Test Cycle (NEDC) was run on a state of the art engine bench.

For light-off testing each sample was placed downstream in the exhaust line from a 6 cylinder light duty diesel engine with 3 L displacement. The engine was mounted in a state of the art engine bench. The CO and HC concentration in the exhaust stream was constant at 1,500 ppm and 350 ppm (C$_3$ basis), respectively. The space velocity was set to 50,000/h. The temperature was increased by the control of the combustion process at constant exhaust gas flow with a rate of 2 K/min.

FIG. 1 shows the results of the CO light-off testing of the catalyst according to the invention comprising three washcoat layers (dashed line, according to example 3) and as a comparative example a catalyst comprising no ceria comprising compound in the first washcoat layer (dotted line). The catalyst according to the present invention provides significantly higher CO conversions than the comparative catalyst at identical temperatures. Further, the CO conversion of 100% is reached at a significantly lower temperature. Therefore, the catalyst according to the present invention affords improved performance with regard to CO oxidation and CO light-off behavior.

Figure 2:
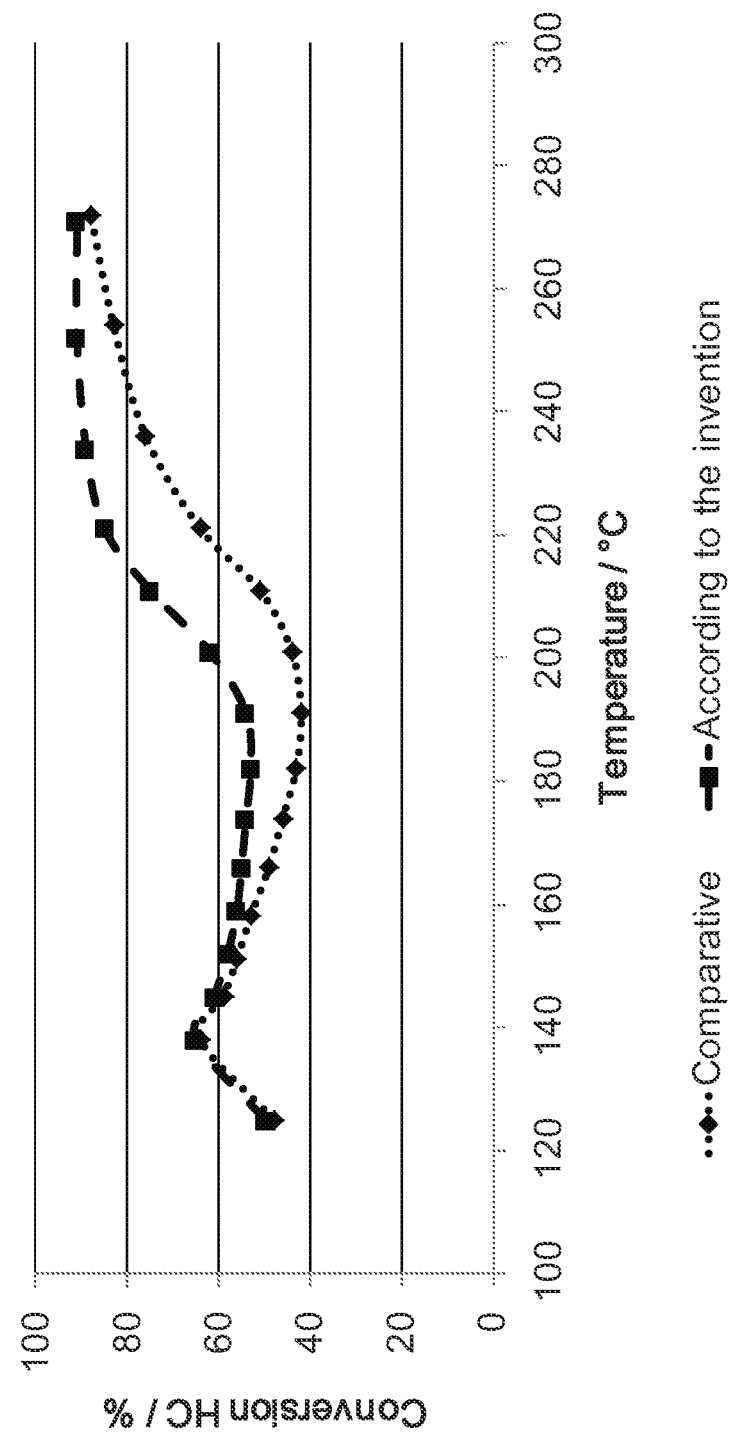
FIG. 2 shows a HC light-off curve obtained from the treatment of diesel exhaust using the DOC provided in example 3 comprising three layers as well as a comparative catalyst comprising no ceria comprising compound in the first washcoat layer. The x-axis of the diagram denoted "Temperature/° C." shows the respective catalyst inlet temperature in ° C. and ranges from 100° C. to 300° C., whereas the y-axis denoted "Conversion HC/%" shows the corresponding conversion of HC to $CO_2$ and $H_2O$ in % and ranges from 0% to 100%.

FIG. 2 shows the results of the HC light-off testing of the catalyst according to the invention comprising three washcoat layers (dashed line, according to example 3) and as a comparative example a catalyst comprising no ceria comprising compound in the first washcoat layer (dotted line). The catalyst according to the present invention provides significantly higher HC conversions than the comparative catalyst at identical temperatures. Further, the maximum HC conversion is reached at a significantly lower temperature. Therefore, the catalyst according to the present invention affords improved performance with regard to HC oxidation and HC light-off behavior.

Figure 3:
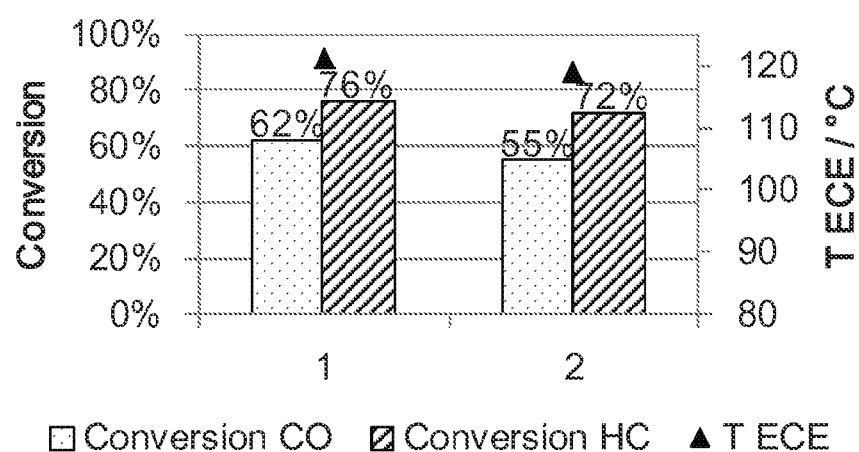
FIG. 3 shows the CO and HC conversion data obtained from the NEDC (New European Driving Cycle) using the DOC provided in example 3 comprising three washcoat layers (1) and a catalyst comprising no ceria comprising compound in the first washcoat layer (2), respectively. The left y-axis of the diagram denoted "conversion/%" shows the CO (dotted) and HC (striped) conversion, respectively, in percent and ranges from 0% to 100%. The right y-axis of the diagram denoted "T ECE/° C." shows the temperature (▲) of the gas feed in the ECE (urban) cycle of the NEDC.

FIG. 3 depicts the conversion of CO (dotted) and HC (striped) obtained from the NEDC (New European Driving Cycle), respectively, of a catalyst according to the invention comprising three washcoat layers (1) and as a comparative example a catalyst comprising no ceria comprising compound in the first washcoat layer (2). It is shown that the catalyst according to the present invention in example 3 shows significantly higher conversions for the respective compounds in comparison to the comparative catalyst.

Figure 4:
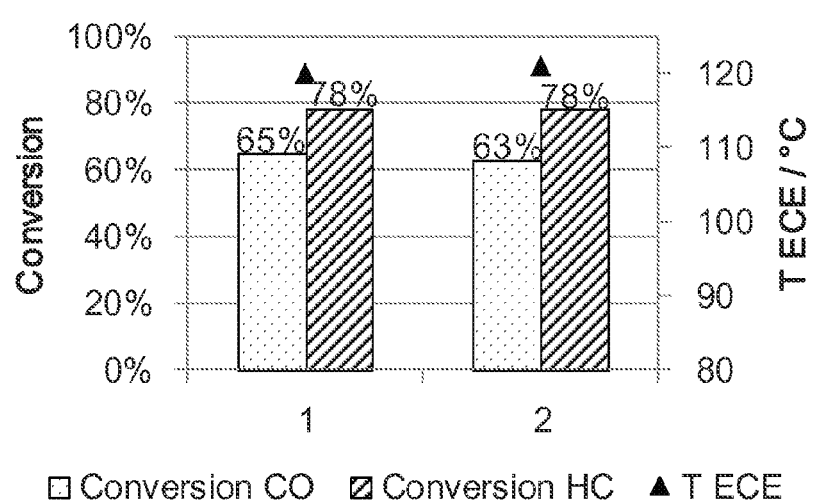
FIG. 4 shows the CO and HC conversion data obtained from the NEDC (New European Driving Cycle) using the DOC provided in example 2 comprising two washcoat layers, wherein the second washcoat layer comprises as the zeolite H-Beta (1) and USZ1 (2), respectively. The left y-axis of the diagram denoted "CO and HC conversion/%" shows the CO (dotted) and HC (striped) conversion, respectively, in percent and ranges from 0% to 100%. The right y-axis of the diagram denoted "T ECE/° C." shows the temperature (▲) of the gas feed in the ECE (urban) cycle of the NEDC.

FIG. 4 depicts the conversion of CO (dotted) and HC (striped) obtained from the NEDC (New European Driving Cycle), respectively, of a catalyst according to the invention comprising two washcoat layers, wherein second washcoat layer comprises as the zeolite H-Beta (1) and USZ1 (2). Both catalysts exhibit high conversions for both CO and HC.

Reference Example 1

Determination of Dv90 Values

1. Sample Preparation
    1.0 g of the material the particle size of which is to be determined was suspended in 100 g deionized water and stirred for 1 min.
2. Apparatus and Respective Parameters Used
    Mastersizer S long bed version 2.15, ser. No. 33544-325; supplier: Malvern Instruments GmbH, Herrenberg, Germany
    focal width: 300RF mm
    beam length: 10.00 mm
    module: MS17
    shadowing: 16.9%
    dispersion model: 3$$D
    analysis model: polydisperse
    correction: none
Cited Literature
    WO 2010/083313
    EP 1 938 893 A2
    U.S. Pat. No. 4,961,917
    U.S. Pat. No. 5,516,497

What is claimed is:

1. A diesel oxidation catalyst comprising:
    a carrier substrate, and
    a first washcoat layer disposed on the substrate, the first washcoat layer comprising palladium supported on a support material comprising a metal oxide, gold supported on a support material comprising a metal oxide, and a ceria comprising compound,
    wherein the first washcoat layer comprises palladium in an amount of from 0.1 to 200 g/ft$^3$, gold in an amount of from 0.1 to 100 g/ft$^3$, and ceria, contained in the ceria comprising compound, in an amount of from 0.001 to 10 g/inch$^3$.

2. The diesel oxidation catalyst according to claim 1, wherein the first washcoat layer comprises at most 0.1 wt.-% platinum, calculated as element and based on the weight of the first washcoat layer, at most 0.1 wt.-% zeolite, based on the weight of the first washcoat layer, and at most 1 wt.-% barium, calculated as barium oxide and based on the weight of the first washcoat layer.

3. The diesel oxidation catalyst according to claim 1, wherein the support material on which the palladium is supported comprises a metal oxide selected from the group consisting of alumina, zirconia, silica, titania, silica-alumina, zirconia-alumina, titania-silica, titania-zirconia, titania-alumina, lanthana-alumina, lanthana-zirconia-alumina, and combinations of two or more thereof, and wherein the support material on which the gold is supported comprises a metal oxide selected from the group consisting of alumina, zirconia, silica, titania, silica-alumina, zirconia-alumina, titania-silica, titania-zirconia, titania-alumina, lanthana-alumina, lanthana-zirconia-alumina, and combinations of two or more thereof.

4. The diesel oxidation catalyst according to claim 1, wherein the ceria comprising compound contains ceria in an amount of at least 90 wt.-%, based on the weight of the compound, and optionally contains at least one stabilizing component selected from the group consisting of zirconium, hafnium, tin, zinc, aluminum, silicon, a rare earth metal other than cerium selected from the group consisting of lanthanum, praseodymium and neodymium, and a combination of two or more thereof.

5. The diesel oxidation catalyst according to claim 1, comprising no further washcoat layer disposed on the first washcoat layer.

6. The diesel oxidation catalyst according to claim 1, comprising at least one further washcoat layer disposed on the first washcoat layer, wherein at least one of the at least one further washcoat layer comprises a zeolite and at least one of the at least one further washcoat layer comprises at least one precious metal selected from the group consisting of platinum, palladium, rhodium, iridium, ruthenium and osmium, wherein the precious metal is supported on a support material comprising a metal oxide selected from the group consisting of alumina, zirconia, silica, titania, silica-alumina, zirconia-alumina, titania-silica, titania-zirconia, titania-alumina, lanthana-alumina, lanthana-zirconia-alumina, and combinations of two or more thereof, wherein at least one of the at least one further washcoat layer comprises two different precious metals, and wherein none of the at least one further washcoat layer comprises more than 0.1 wt.-% gold, calculated as element and based on the weight of the further washcoat layer.

7. The diesel oxidation catalyst according to claim 6, wherein the metal oxide is silica-gamma-alumina having a silica content of at most 5 wt.-% based on the silica-gamma-alumina.

8. The diesel oxidation catalyst according to claim 6, comprising
    a second washcoat layer disposed on the first washcoat layer, the second washcoat layer comprising palladium, platinum, or palladium and platinum, and comprising a zeolite,
    wherein the palladium is supported on a support material comprising a metal oxide, and wherein the platinum is supported on a support material comprising a metal oxide, wherein the support materials comprising a metal oxide are independently selected from the group consisting of alumina, zirconia, silica, titania, silica-alumina, zirconia-alumina, titania-silica, titania-zirconia, titania-alumina, lanthana-alumina, lanthana-zirconia-alumina, and combinations of two or more thereof, wherein the diesel oxidation catalyst contains no further washcoat layer disposed on the second washcoat layer.

9. The diesel oxidation catalyst according to claim 8, wherein the second washcoat layer comprises palladium in an amount of from 0.1 to 200 g/ft$^3$ and/or platinum in an amount of from 0.1 to 200 g/ft$^3$.

10. The diesel oxidation catalyst according to claim 8, wherein the second washcoat layer comprises at most 0.1 wt.-% ceria, based on the weight of the second washcoat layer, and/or at most 0.1 wt.-% gold, calculated as element and based on the weight of the second washcoat layer.

11. The diesel oxidation catalyst according to claim 6, comprising a second washcoat layer disposed on the first washcoat layer, the second washcoat layer comprising palladium supported on a support material comprising a metal oxide and/or platinum supported on a support material comprising a metal oxide, the second washcoat layer further comprising a zeolite, and a third washcoat layer disposed on the second washcoat layer, the third washcoat layer comprising palladium supported on a support material comprising a metal oxide, and/or platinum supported on a support material comprising a metal oxide, wherein the support materials comprising a metal oxide of the second and the third washcoat layer are independently selected from the group consisting of alumina, zirconia, silica, titania, silica-alumina, zirconia-alumina, titania-silica, titania-zirconia, titania-alumina, lanthana-alumina, lanthana-zirconia-alumina, and combinations of two or more thereof, wherein the diesel oxidation catalyst contains no further washcoat layer disposed on the third washcoat layer.

12. The diesel oxidation catalyst according to claim 11, wherein the second washcoat layer comprises palladium in an amount of from 0.1 to 50 g/ft$^3$.

13. The diesel oxidation catalyst according to claim 11, wherein the second washcoat layer comprises at least one zeolite, wherein the at least one zeolite is contained in the second washcoat layer in an amount of from 0.001 to 10 g/inch$^3$.

14. The diesel oxidation catalyst according to claim 11, wherein the second washcoat layer comprises a ceria comprising compound, wherein the second washcoat layer comprises ceria, contained in the ceria comprising compound in an amount of from 0.05 to 4 g/inch$^3$.

15. The diesel oxidation catalyst according to claim 11, wherein the third washcoat layer comprises palladium in an amount of from 0.1 to 200 g/ft$^3$ and/or platinum in an amount of from 0.1 to 200 g/ft$^3$.

16. The diesel oxidation catalyst according to claim 11, wherein the third washcoat layer comprises at most 0.1 wt.-% of a ceria comprising compound, based on the weight of the third washcoat layer and/or at most 0.1 wt.-% zeolite, based on the weight of the third washcoat layer.

17. The diesel oxidation catalyst according to claim 11, wherein the third washcoat comprises barium in an amount of from 0.01 to 3 g/inch$^3$, calculated as barium oxide.

18. A process for the preparation of diesel oxidation catalyst according to claim 1, said process comprising
a) providing a carrier substrate,
b) applying a first washcoat layer on the substrate by impregnating the substrate with a mixture comprising palladium supported on a support material comprising a metal oxide, gold supported on a support material comprising a metal oxide, and a ceria comprising compound, optionally followed by calcination, carried out at a temperature in the range of from 450 to 700° C.;
c) optionally applying a second washcoat onto the substrate obtained from b), having disposed thereon the first washcoat layer, optionally followed by calcination carried out at a temperature in the range of from 450 to 700° C.;
d) optionally applying a third washcoat onto the substrate obtained from c), having disposed thereon the first washcoat layer and disposed on the first washcoat layer the second washcoat layer, optionally followed by calcination carried out at a temperature in the range of from 450 to 700° C.;
e) optionally applying further washcoat onto the substrate obtained from d) having disposed thereon the first washcoat layer, disposed on the first washcoat layer the second washcoat layer and disposed on the second washcoat layer the third washcoat layer, optionally followed by calcination carried out at a temperature in the range of from 450 to 700° C.;
wherein either only the first, or only the first and the second, or only the first and the second and the third washcoat are applied.

19. The process of claim 18, comprising c), or c) and d), or c) and d) and e), wherein at least one of the second, third, or further washcoats comprises a zeolite and at least one of the second, third, or further washcoats comprises a precious metal selected from the group consisting of platinum, palladium, rhodium, iridium, ruthenium and osmium, wherein the precious metal is supported on a support material comprising a metal oxide.

20. A system for treating a gaseous exhaust stream of a diesel engine, the system comprising:
an exhaust conduit in fluid communication with the diesel engine via an exhaust manifold,
the diesel oxidation catalyst according to claim 1, wherein the carrier substrate is a wall-flow substrate or a flow through substrate, and
one or more of the following in fluid communication with the layered diesel oxidation catalyst composite: a catalyzed soot filter (CSF), a selective catalytic reduction (SCR) article, a NOx storage and reduction (NSR) catalytic article.

21. A diesel oxidation catalyst comprising:
a carrier substrate, and
a first washcoat layer disposed on the substrate, the first washcoat layer comprising palladium supported on a support material comprising a metal oxide, gold supported on a support material comprising a metal oxide, and ceria comprising compound,
wherein the first washcoat layer comprises at most 0.1 wt-% platinum, calculated as element and based on the weight of the first washcoat layer, at most 0.1 wt-% zeolite, based on the weight of the washcoat layer, and at most 1 wt-% barium, calculated as barium oxide and based on the weight of the first washcoat layer.

* * * * *